US012586917B2

(12) United States Patent
Jia et al.

(10) Patent No.: US 12,586,917 B2
(45) Date of Patent: Mar. 24, 2026

(54) FREQUENCY SELECTIVE SURFACE UNIT, FREQUENCY SELECTIVE SURFACE STRUCTURE, ELECTRONIC DEVICE AND RADOME

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Mengwen Jia, Beijing (CN); Dongdong Zhang, Beijing (CN); Xichao Fan, Beijing (CN); Yali Wang, Beijing (CN); Yafei Zhang, Beijing (CN); Guoqiang Tang, Beijing (CN); Feng Qu, Beijing (CN); Biqi Li, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 204 days.

(21) Appl. No.: 18/041,636

(22) PCT Filed: Feb. 28, 2022

(86) PCT No.: PCT/CN2022/078477

§ 371 (c)(1),
(2) Date: Feb. 14, 2023

(87) PCT Pub. No.: WO2023/159637

PCT Pub. Date: Aug. 31, 2023

(65) Prior Publication Data

US 2024/0258706 A1 Aug. 1, 2024

(51) Int. Cl.

*H01Q 15/00* (2006.01)
*H01P 1/20* (2006.01)

(Continued)

(52) U.S. Cl.

CPC ........... *H01Q 15/0013* (2013.01); *H01P 1/20* (2013.01); *H01Q 1/24* (2013.01); *H01Q 1/425* (2013.01);

(Continued)

(58) Field of Classification Search

CPC ...... H01Q 15/0013; H01Q 1/24; H01Q 1/425; H01Q 15/0026; H01Q 15/0053; H01P 1/20

See application file for complete search history.

(56) References Cited

U.S. PATENT DOCUMENTS

| | | | | | |
|---|---|---|---|---|---|
| 3,568,102 | A * | 3/1971 | Tseng | H03H 9/42 | 331/107 A |
| 3,842,421 | A * | 10/1974 | Rootsey | H01Q 19/193 | 343/837 |

(Continued)

FOREIGN PATENT DOCUMENTS

| | | | | |
|---|---|---|---|---|
| CN | 106887692 A | 6/2017 | | |
| CN | 108963395 A | * 12/2018 | | H01P 1/20 |

(Continued)

OTHER PUBLICATIONS

Adrian-Petru Buta et al., Fractal Based Frequency Selective Surface with Broadband Characteristics, International Symposium on Signals, Circuits and Systems, Jul. 11-12, 2019, IEEE, Iasi, Romania.

(Continued)

*Primary Examiner* — Dameon E Levi
*Assistant Examiner* — Jordan E. DeWitt
(74) *Attorney, Agent, or Firm* — XSENSUS LLP

(57) ABSTRACT

A frequency selective surface unit includes dielectric substrate(s), first resonant pattern(s) and second resonant pattern(s). A first resonant pattern is disposed on a dielectric substrate. Each of the first resonant pattern(s) includes a plurality of protruding portions. A second resonant pattern is (Continued)

disposed on the dielectric substrate; and the second resonant pattern and the first resonant pattern have a distance therebetween in a direction parallel to a plane where the dielectric substrate is located and/or a direction perpendicular to the dielectric substrate.

12 Claims, 16 Drawing Sheets

(51) Int. Cl.
*H01Q 1/24* (2006.01)
*H01Q 1/42* (2006.01)

(52) U.S. Cl.
CPC ..... *H01Q 15/0026* (2013.01); *H01Q 15/0053* (2013.01)

(56) References Cited

U.S. PATENT DOCUMENTS

| | | | | | |
|---|---|---|---|---|---|
| 4,656,487 | A * | 4/1987 | Sureau | H01Q 15/0013 | 343/872 |
| 4,814,785 | A * | 3/1989 | Wu | H01Q 15/0013 | 333/202 |
| 5,130,718 | A * | 7/1992 | Wu | H01Q 15/0033 | 343/781 CA |
| 5,208,603 | A * | 5/1993 | Yee | H01Q 15/0026 | 343/872 |
| 5,497,169 | A * | 3/1996 | Wu | H01Q 15/0033 | 333/202 |
| 5,528,249 | A * | 6/1996 | Gafford | H01Q 1/425 | 343/873 |
| 5,917,458 | A * | 6/1999 | Ho | H01Q 9/285 | 343/769 |
| 6,218,978 | B1 * | 4/2001 | Simpkin | H01Q 15/0026 | 343/756 |
| 6,452,549 | B1 * | 9/2002 | Lo | H01Q 21/064 | 343/756 |
| 7,015,868 | B2 * | 3/2006 | Puente Baliarde | H01Q 1/36 | 343/800 |
| 2003/0034918 | A1 * | 2/2003 | Werner | H01Q 1/38 | 343/909 |
| 2003/0067410 | A1 * | 4/2003 | Puzella | H01Q 21/0087 | 343/700 MS |
| 2003/0112186 | A1 * | 6/2003 | Sanchez | H01Q 9/27 | 343/909 |
| 2003/0122729 | A1 * | 7/2003 | Diaz | H01Q 9/0442 | 343/754 |
| 2003/0214456 | A1 * | 11/2003 | Lynch | H01Q 15/0026 | 343/753 |
| 2004/0008147 | A1 * | 1/2004 | Killen | H01Q 15/0053 | 343/753 |
| 2004/0017331 | A1 * | 1/2004 | Crawford | H01Q 15/002 | 343/909 |
| 2005/0012677 | A1 * | 1/2005 | Brown | H01Q 1/364 | 343/909 |
| 2007/0159395 | A1 * | 7/2007 | Sievenpiper | H01Q 9/30 | 343/909 |
| 2009/0121014 | A1 * | 5/2009 | Tharp | G02B 5/204 | 235/380 |
| 2009/0273527 | A1 * | 11/2009 | Behdad | H01Q 15/0026 | 343/705 |
| 2010/0097048 | A1 * | 4/2010 | Werner | H01Q 17/00 | 324/76.11 |
| 2010/0231479 | A1 * | 9/2010 | Hauhe | H01Q 25/008 | 343/810 |
| 2011/0127081 | A1 * | 6/2011 | van Dijk | H01Q 1/525 | 174/377 |
| 2011/0210903 | A1 * | 9/2011 | Sarabandi | H01Q 15/0086 | 343/904 |
| 2012/0051457 | A1 * | 3/2012 | Ma | H04L 5/0023 | 375/295 |
| 2013/0050043 | A1 * | 2/2013 | Gross, III | H01Q 15/14 | 343/912 |
| 2015/0115798 | A1 * | 4/2015 | Szatkowski | H05H 1/2406 | 315/111.21 |
| 2015/0295309 | A1 * | 10/2015 | Manry, Jr. | H01Q 3/247 | 342/374 |
| 2016/0146724 | A1 * | 5/2016 | Gao | E21B 49/08 | 250/269.1 |
| 2016/0265352 | A1 * | 9/2016 | Gao | E21B 49/08 | |
| 2017/0033468 | A1 * | 2/2017 | Wong | H01Q 15/0086 | |
| 2017/0062945 | A1 * | 3/2017 | Foo | H01Q 25/008 | |
| 2018/0035535 | A1 * | 2/2018 | Wall | H01Q 15/0006 | |
| 2018/0062233 | A1 * | 3/2018 | Lindsey | H01P 1/2005 | |
| 2019/0131713 | A1 * | 5/2019 | Luo | H01Q 15/16 | |
| 2019/0386364 | A1 * | 12/2019 | Liang | H01Q 15/0086 | |
| 2020/0163175 | A1 * | 5/2020 | Huang | H05B 6/6408 | |
| 2020/0168393 | A1 * | 5/2020 | Long | H01F 27/402 | |
| 2020/0212586 | A1 * | 7/2020 | Lu | H01Q 15/0013 | |
| 2020/0295446 | A1 * | 9/2020 | Cooley | H01Q 21/065 | |
| 2021/0126380 | A1 * | 4/2021 | Tamakita | H01Q 9/04 | |
| 2022/0140070 | A1 * | 5/2022 | Hakamo | H10D 1/716 | 257/534 |
| 2022/0294120 | A1 * | 9/2022 | Koul | H01Q 15/14 | |
| 2023/0327645 | A1 * | 10/2023 | Goto | H03H 9/131 | 333/193 |
| 2024/0258706 | A1 * | 8/2024 | Jia | H01Q 15/00 | |

FOREIGN PATENT DOCUMENTS

| | | | | |
|---|---|---|---|---|
| CN | 109004369 | A * | 12/2018 | H01Q 15/24 |
| CN | 107579352 | B | 12/2019 | |
| CN | 108899656 | B * | 1/2020 | H01Q 15/0013 |
| CN | 108539431 | B * | 2/2020 | H01Q 15/0093 |
| CN | 110931983 | A * | 3/2020 | H01Q 15/0013 |
| CN | 111628294 | A * | 9/2020 | |
| CN | 212033252 | U | 11/2020 | |
| CN | 112652888 | A | 4/2021 | |
| CN | 112736481 | A * | 4/2021 | H01Q 15/0026 |
| CN | 114039212 | A * | 2/2022 | H01Q 17/004 |
| CN | 114597672 | A * | 6/2022 | H01Q 17/008 |
| CN | 116706561 | A * | 9/2023 | H01Q 15/0026 |
| CN | 117031787 | A * | 11/2023 | G02F 1/0102 |
| EP | 4456315 | A1 * | 10/2024 | H01P 3/003 |
| GB | 2337860 | A * | 12/1999 | H01Q 15/0026 |
| KR | 101937444 | B1 * | 1/2019 | H05K 9/0084 |
| WO | WO-2009075449 | A1 * | 6/2009 | H01Q 15/0013 |
| WO | WO-2017101736 | A1 * | 6/2017 | H01Q 1/42 |
| WO | WO-2021251169 | A1 * | 12/2021 | H01Q 1/38 |
| WO | WO-2022253545 | A1 * | 12/2022 | H01Q 1/422 |

OTHER PUBLICATIONS

Ayan Chatterjee et al., Frequency-Dependent Directive Radiation of Monopole-Dielectric Resonator Antenna Using a Conformal Frequency Selective Surface, IEEE Transactions on Antennas and Propagation, May 2017, pp. 2233-2239, vol. 65, No. 5.

* cited by examiner

FREQUENCY SELECTIVE SURFACE UNIT, FREQUENCY SELECTIVE SURFACE STRUCTURE, ELECTRONIC DEVICE AND RADOME

CROSS-REFERENCE TO RELATED APPLICATION

This application is a national phase entry under 35 USC 371 of International Patent Application No. PCT/CN2022/078477, filed on Feb. 28, 2022, which is incorporated herein by reference in its entirety.

TECHNICAL FIELD

The present disclosure relates to the field of microwave technologies, and in particular, to a frequency selective surface unit, a frequency selective surface structure, an electronic device, and a radome.

BACKGROUND

The frequency selective surface (FSS) structure is a two-dimensional periodic array structure, which is essentially a spatial filter, and interacts with electromagnetic waves to exhibit obvious band-pass or band-stop filtering characteristics. Frequency selective surface structures are used in electronic devices of various sizes to meet different requirements for electromagnetic communication or electromagnetic interference. For example, an electronic device includes a radome, a radar, or a frequency range multiplexer.

SUMMARY

In an aspect, a frequency selective surface unit is provided. The frequency selective surface unit includes at least one dielectric substrate, at least one first resonant pattern and at least one second resonant pattern. A first resonant pattern is disposed on a dielectric substrate, and each of the at least one first resonant pattern includes a plurality of protruding portions. A second resonant pattern is disposed on the dielectric substrate, and the second resonant pattern and the first resonant pattern have a distance therebetween in a direction parallel to a plane where the dielectric substrate is located and/or in a direction perpendicular to the dielectric substrate.

In some embodiments, the first resonant pattern is a fractal pattern. The plurality of protruding portions are classified into a plurality of stages of sub-portions, and sub-portions in a next stage are protruding portions located on edges of a sub-portion in a current stage; except for a first stage of sub-portions, each stage of sub-portions includes at least two sub-portions separated from each other, and the at least two sub-portions included in each stage of sub-portions have a same structure.

In some embodiments, each sub-portion has a triangular structure or a rectangular structure.

In some embodiments, the second resonant pattern includes a single rectangular ring; the first resonant pattern and the second resonant pattern are located on a same surface of the dielectric substrate, and the second resonant pattern surrounds the first resonant pattern.

In some embodiments, the second resonant pattern includes at least two rectangular rings whose centers overlap, and the at least two rectangular rings have a distance therebetween.

In some embodiments, the second resonant pattern and the first resonant pattern are disposed on a same surface of the dielectric substrate; and the second resonant pattern surrounds the first resonant pattern.

In some embodiments, the second resonant pattern and the first resonant pattern are disposed on two opposite surfaces of the dielectric substrate in the direction perpendicular to the dielectric substrate, respectively. An orthographic projection of the second resonant pattern on the dielectric substrate partially overlaps with an orthographic projection of the first resonant pattern on the dielectric substrate.

In some embodiments, the second resonant pattern is a serpentine structure that includes a plurality of first extending portions and a plurality of second extending portions. The plurality of first extending portions are parallel to each other, an extension direction of the plurality of first extending portions intersects an extension direction of the plurality of second extending portions, and two adjacent first extending portions are connected to each other through a second extending portion. The second resonant pattern and the first resonant pattern are disposed on two opposite surfaces of the dielectric substrate in the direction perpendicular to the dielectric substrate, respectively; an orthographic projection of the first resonant pattern on the dielectric substrate partially overlaps with an orthographic projection of at least one first extending portion on the dielectric substrate.

In some embodiments, the frequency selective surface unit includes a plurality of dielectric substrates that are arranged in a stack, a plurality of first resonant patterns and a plurality of second resonant patterns; the plurality of first resonant patterns and the plurality of second resonant patterns are alternately arranged in the direction perpendicular to the dielectric substrate, and at least one dielectric substrate is arranged between a first resonant pattern and a second resonant pattern that are adjacent.

In some embodiments, the plurality of first resonant patterns have a same structure, and/or the plurality of second resonant patterns have a same structure.

In some embodiments, an orthographic projection of the first resonant pattern on the dielectric substrate partially overlaps with an orthographic projection of the second resonant pattern on the dielectric substrate, and overlapping portions of the orthographic projections of the first resonant pattern and the second resonant pattern on the dielectric substrate include a plurality of overlapping regions separated from each other.

In some embodiments, a first resonant pattern is located on an outermost surface of an outermost dielectric substrate of the frequency selective surface unit in the direction perpendicular to the dielectric substrate.

In some embodiments, a thickness of the at least one dielectric substrate is in a range from 50 μm to 500 μm.

In some embodiments, a material of the at least one dielectric substrate includes a flexible insulating material.

In another aspect, a frequency selective surface structure is provided. The frequency selective surface structure includes a plurality of frequency selective surface units arranged in an array as described in any of the above embodiments.

In yet another aspect, an electronic device is provided. The electronic device includes the frequency selective surface structure as described in the above embodiments.

In yet another aspect, a radome is provided. The radome includes the frequency selective surface structure as described in the above embodiments, and a radome body.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art can obtain other drawings according to these accompanying drawings. In addition, the accompanying drawings in the following description may be regarded as schematic diagrams, but are not limitations on an actual size of a product, an actual process of a method and an actual timing of a signal involved in the embodiments of the present disclosure.

DETAILED DESCRIPTION

Figure 1:
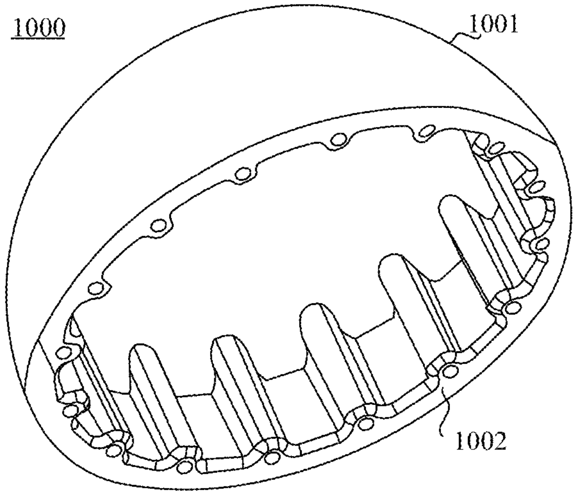
FIG. 1 is a diagram showing a structure of an electronic device, in accordance with some embodiments.

Technical solutions in some embodiments of the present disclosure will be described clearly and completely with reference to the accompanying drawings below. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term “comprise” and other forms thereof such as the third-person singular form “comprises” and the present participle form “comprising” are construed in an open and inclusive meaning, i.e., “including, but not limited to”. In the description of the specification, the terms such as “one embodiment,” “some embodiments,” “exemplary embodiments,” “example,” “specific example” or “some examples” are intended to indicate that specific features, structures, materials or characteristics related to the embodiment(s) or example(s) are included in at least one embodiment or example of the present disclosure. Schematic representations of the above term do not necessarily refer to the same embodiment(s) or example(s). In addition, specific features, structures, materials or characteristics may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of" or "the plurality of" means two or more unless otherwise specified.

In the description of some embodiments, the expressions "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact with each other. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has the same meaning as the phrase "at least one of A, B or C", both including following combinations of A, B and C: only A, only B, only C, a combination of A and B, a combination of A and C, a combination of B and C, and a combination of A, B and C.

The phrase "A and/or B" includes following three combinations: only A, only B, and a combination of A and B.

The use of the phrase "applicable to" or "configured to" herein is meant an open and inclusive expression, which does not exclude devices that are applicable to or configured to perform additional tasks or steps.

In addition, the use of the phase "based on" or "according to" means openness and inclusiveness, since a process, step, calculation or other action that is "based on" or "according to" one or more of the stated conditions or values may, in practice, be based on additional conditions or values exceeding those stated.

The term such as "about", "substantially" or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

As used herein, "parallel", "perpendicular" and "equal" include the stated conditions and the conditions similar to the stated conditions, and the range of the similar conditions is within an acceptable range of deviation, where the acceptable deviation range is determined by a person of ordinary skilled in the art in consideration of the measurement in question and the error associated with the measurement of a specific quantity (i.e., limitations of a measurement system). For example, the term "parallel" includes absolute parallelism and approximate parallelism, and an acceptable range of deviation of the approximate parallelism may be, for example, a deviation within 5%; the term "perpendicular" includes absolute perpendicularity and approximate perpendicularity, and an acceptable range of deviation of the approximate perpendicularity may also be, for example, a deviation within 5°. The term "equal" includes absolute equality and approximate equality, and an acceptable range of deviation of the approximate equality may be, for example, a difference between two equals of less than or equal to 5% of either of the two equals.

It will be understood that, when a layer or element is referred to as being on another layer or substrate, it may refers to that the layer or element is directly on the another layer or substrate, and it is also possible that intervening layer(s) are present between the layer or element and the another layer or substrate.

Exemplary embodiments are described herein with reference to sectional views and/or plan views as idealized exemplary drawings. In the accompanying drawings, thicknesses of layers and sizes of regions are enlarged for clarity. Thus, variations in shape with respect to the accompanying drawings due to, for example, manufacturing technologies and/or tolerances may be envisaged. Therefore, the exemplary embodiments should not be construed as being limited to the shapes of the regions shown herein, but as including deviations in shape due to, for example, manufacturing. For example, a resonant pattern shown in a polygon shape generally has a feature of being curved. Therefore, the regions shown in the accompanying drawings are schematic in nature, and their shapes are not intended to show actual shapes of regions in a device, and are not intended to limit the scope of the exemplary embodiments.

In addition, examples of various specific processes and materials are provided in the present disclosure, but a person of ordinary skill in the art may be aware of the application of other processes and/or the use of other materials.

As shown in FIG. 1, some embodiments of the present disclosure provide an electronic device 1000. For example, the electronic device 1000 may be an antenna (or a radome), a radar, an aircraft, a frequency range multiplexer or other devices that can filter electromagnetic waves.

For example, as shown in FIG. 1, the electronic device 1000 is a radome. A frequency selective surface structure 1001 is attached to a surface of a radome body 1002. The radome can radiate electromagnetic waves within a passband frequency range of the frequency selective surface structure 1001. In this way, a terminal device can receive electromagnetic waves filtered by the frequency selective surface structure 1001.

In general, in a case where the frequency selective surface structure 1001 is applied in a wireless communication scenario, a passband bandwidth of the frequency selective surface structure is narrow, and operation frequency bands of different electronic devices are different, resulting in poor versatility of the frequency selective surface structure. Thus, different frequency selective surface structures need to be set according to different electronic devices, which will result in high costs. A communication frequency band required for normal operation of an electronic device is an operation frequency band of the electronic device. Electromagnetic waves in the operation frequency band can pass through the frequency selective surface structure, and electromagnetic waves outside the operation frequency band cannot pass through the frequency selective surface structure.

Figure 2:
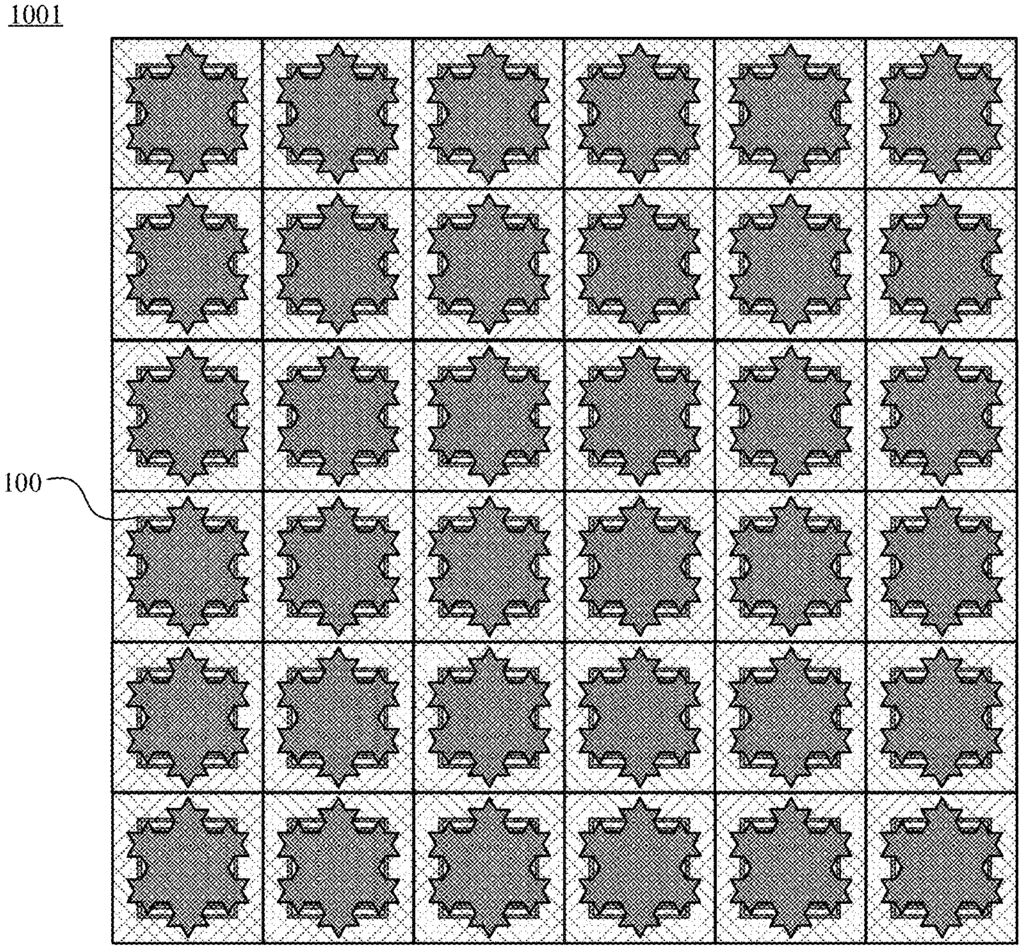
FIG. 2 is a diagram showing a structure of a frequency selective surface structure, in accordance with some embodiments.

In order to solve the above problems, as shown in FIG. 2, in some embodiments, the frequency selective surface structure 1001 provided in the present disclosure includes a plurality of frequency selective surface units 100 that are arranged in an array. A passband bandwidth and a passband frequency range of the frequency selective surface structure 1001 are the same as a passband bandwidth and a passband frequency range of each frequency selective surface unit 100, respectively. The greater the number of the frequency selective surface units 100 is, the greater the number of signals that pass through the frequency selective surface structure 1001.

For example, structures (sizes and shapes of respective portions) of the plurality of frequency selective surface units 1001 in the frequency selective surface structure 1001 are the same. In this way, an operation frequency band of each frequency selective surface unit 100 has the same bandwidth, which avoids interference of signals carried by electromagnetic waves within different frequency bands, thereby improving communication quality.

In some embodiments, as shown in FIGS. 7 to 24, the frequency selective surface unit 100 includes a dielectric substrate 101.

A material of the dielectric substrate 101 includes a flexible insulating material. For example, the flexible insulating material includes one or more of polyethylene terephthalate (PI), polyethylene terephthalate (PET), thermoplastic polyurethane (TPU), cyclo olefin polymer (COP) and triacetyl cellulose (TAC). For example, the material of the dielectric substrate 101 includes PET.

In the related art, a dielectric substrate is made of a hard material, and a non-bendable nature of the hard material leads to poor conformability with an electronic device and poor tightness of fit with the electronic device. In the embodiments of the present disclosure, the dielectric substrate 101 is flexible, there is no need to perform a profiling design according to a specific structure of the electronic device 1000, and the process is simple. In addition, the flexible dielectric substrate 101 can be extended according to a shape of the electronic device 1000 attached thereto. Therefore, it may be possible to improve tightness of fit between the frequency selective surface unit 100 and the electronic device 1000, and reduce the impact on the communication quality due to poor conformability between the frequency selective surface unit 100 and the electronic device 1000. It will be understood that, the dielectric substrate 101 is made of an insulating material.

A thickness of the dielectric substrate 101 is in a range from 50 μm to 500 μm. For example, the thickness of the dielectric substrate 101 is 50 μm, 200 μm or 500 μm. In the related art, the dielectric substrate with a shape is made of the hard material, and in a case where the dielectric substrate is manufactured to be a thin structure, the dielectric substrate is easily broken due to high hardness of the hard material. Compared to the above situation in the related art, in the embodiments of the present disclosure, by using the above material, it facilitates the manufacturing of the dielectric substrate 101 having a small thickness and certain rigidity, which is conducive to realizing a low profile of the frequency selective surface structure 1001, i.e., conducive to reducing a thickness of the frequency selective surface structure 1001.

In some embodiments, as shown in FIGS. 7 to 24, the frequency selective surface unit 100 includes first resonant pattern(s) 110 and second resonant pattern(s) 120.

Figure 4A:
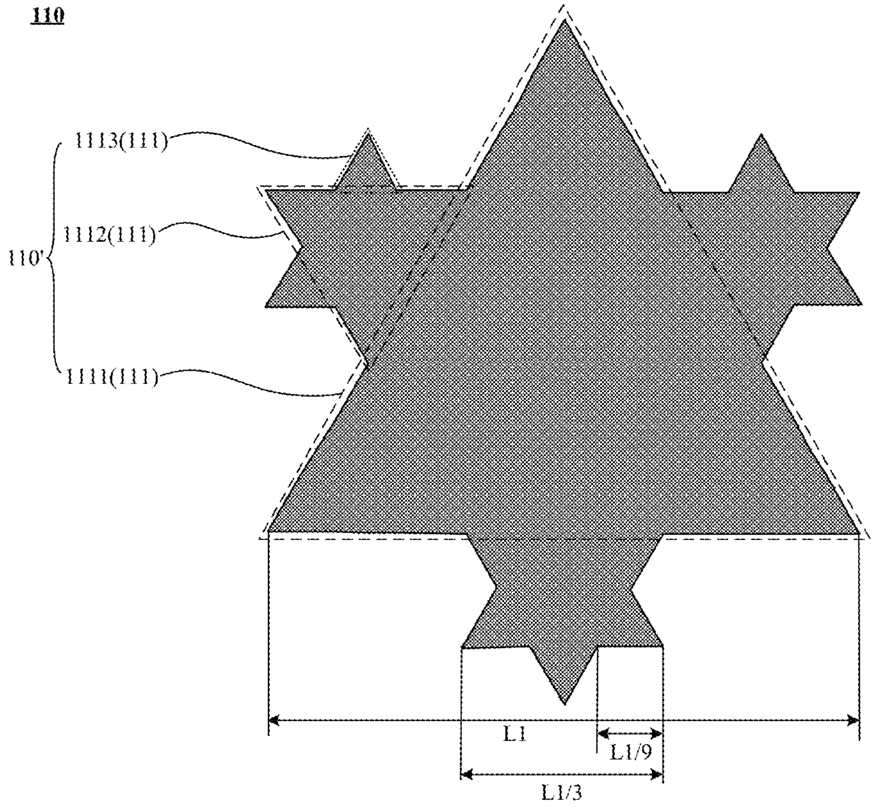
FIG. 4A is a diagram showing a structure of another first resonant pattern, in accordance with some embodiments.
Figure 4B:
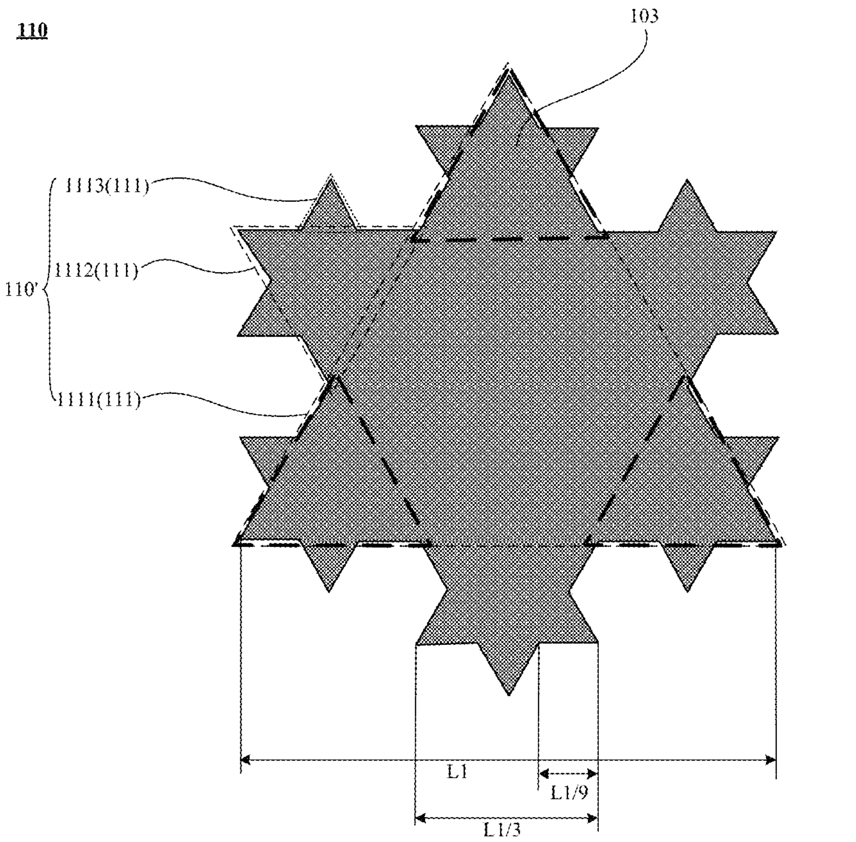
FIG. 4B is a diagram showing a structure of yet another first resonant pattern, in accordance with some embodiments.

As shown in FIG. 4B, the first resonant pattern 110 includes a plurality of protruding portions 110'. The first resonant pattern 110 is disposed on the dielectric substrate 101. The second resonant pattern 120 is disposed on the dielectric substrate 101. In a direction parallel to a plane where the dielectric substrate 101 is located and/or in a direction perpendicular to the dielectric substrate 101, and the second resonant pattern 120 and the first resonant pattern 110 have a distance therebetween. The direction perpendicular to the dielectric substrate 101 may be a thickness direction of the dielectric substrate 101, e.g., a third direction Z as shown in FIG. 8.

Figure 7:
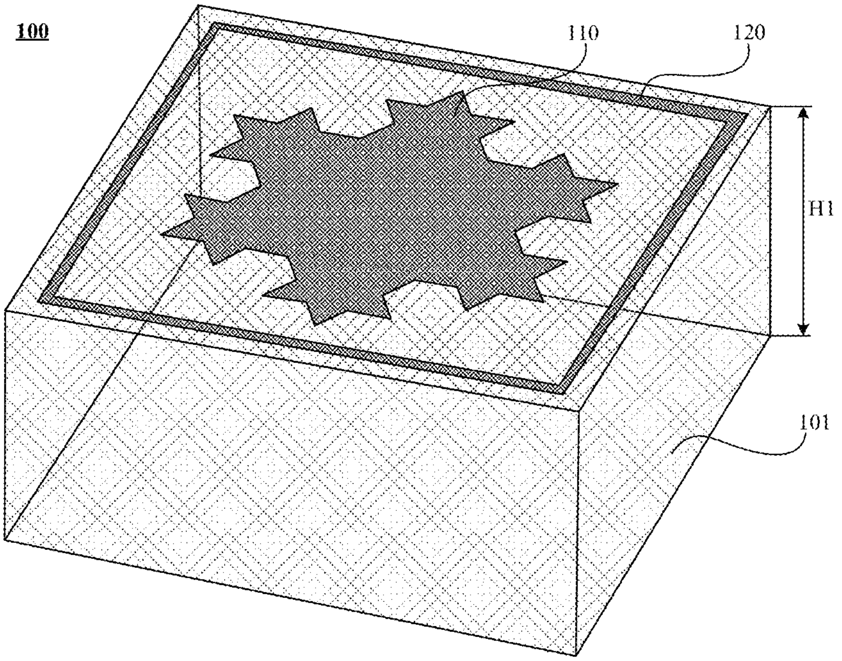
FIG. 7 is a diagram showing a structure of a frequency selective surface unit, in accordance with some embodiments.

For example, as shown in FIG. 7, the first resonant pattern 110 and the second resonant pattern 120 are located on a same surface of the dielectric substrate 101, and the first resonant pattern 110 and the second resonant pattern 120 have a distance therebetween.

Figure 8:
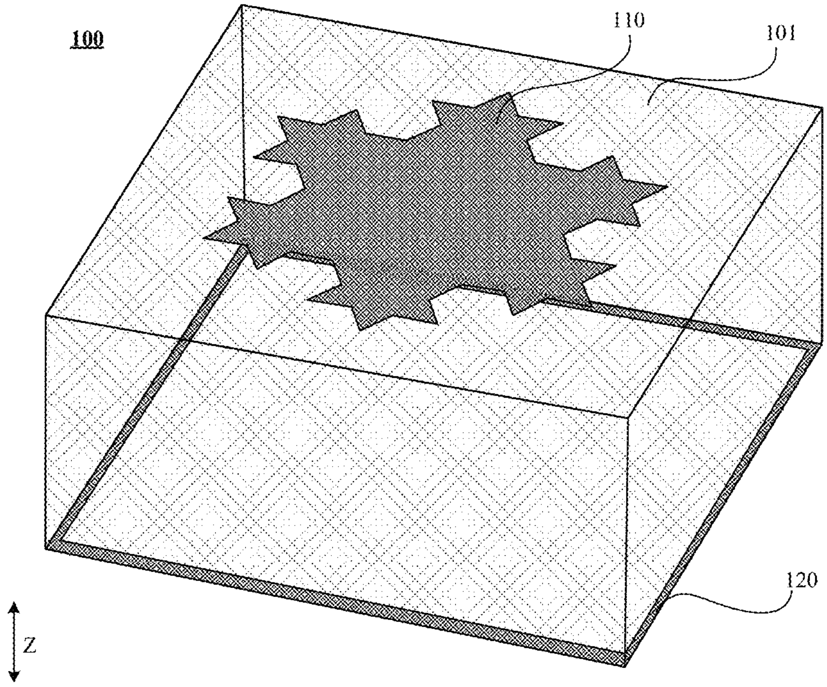
FIG. 8 is a diagram showing a structure of another frequency selective surface unit, in accordance with some embodiments.

Alternatively, as shown in FIG. 8, the first resonant pattern 110 and the second resonant pattern 120 are located on two opposite surfaces of the dielectric substrate 101, respectively; in the direction perpendicular to the dielectric substrate 101, the first resonant pattern 110 and the second resonant pattern 120 have a distance therebetween.

Alternatively, a first resonant pattern 110 and a second resonant pattern 120 are disposed on a surface of the dielectric substrate 101, and the first resonant pattern 110 and the second resonant pattern 120 on the surface have a distance therebetween; another first resonant pattern 110 and another second resonant pattern 120 are disposed on another surface of the dielectric substrate 101 that is opposite to the surface of the dielectric substrate 101, and the another first resonant pattern 110 and the another second resonant pattern 120 on the another surface have a distance therebetween; in addition, the first resonant pattern 110 and the another second resonant pattern 120 on the two opposite surfaces of the dielectric substrate 101 also have a distance therebetween.

Alternatively, the dielectric substrate 101 includes a first surface and a second surface that are arranged opposite to each other. The first resonant pattern 110 is disposed on the first surface. A portion of the second resonant pattern 120 is disposed on the first surface, and another portion of the second resonant pattern 120 is disposed on the second surface. The first resonant pattern and the portion of the second resonant pattern disposed on the first surface have a distance therebetween, and the first resonant pattern and the another portion of the second resonant pattern disposed on the second surface have a distance therebetween.

The frequency selective surface unit 100 in the present disclosure includes two resonant patterns (i.e., the first resonant pattern 110 and the second resonant pattern 120) that are spaced apart, and the number of resonant points generated by the two resonant patterns that are spaced apart in an electric field is greater than a sum of the number of respective resonant points generated by the two resonant patterns in the electric field. In this way, the number of resonant points of the frequency selective surface unit 100 is increased. As a result, the passband frequency range of the frequency selective surface unit 100 is increased, and the bandwidth of the frequency selective surface structure 1001 is increased.

It will be understood that a resonant point is a position where a resonant pattern resonates with an electromagnetic wave. The electromagnetic wave has a great energy at the resonant point, and the energy may be transmitted to another resonant pattern adjacent to the resonant pattern, so that resonance occurs at a position of the another resonant pattern adjacent to the resonant pattern. In this way, an electromagnetic wave at a resonant point of a resonant pattern can be transmitted to another resonant pattern, so that the electromagnetic wave passes through a plurality of resonant patterns and then is received by the electronic device.

Materials of the first resonant pattern 110 and the second resonant pattern 120 each include a metal conductive material. For example, the metal conductive material includes any one or more of silver (Ag), copper (Cu), magnesium (Mg), aluminum (Al), platinum (Pt), gold (Au), nickel (Ni), chromium (Cr) and lithium (Li). For example, the materials of the first resonant pattern 110 and the second resonant pattern 120 may be the same or different. For example, the materials of the first resonant pattern 110 and the second resonant pattern 120 each include Cu. Cu metal has a good performance in transporting induced charges due to an action of an electric field.

Thicknesses of the first resonant pattern 110 and the second resonant pattern 120 are each in a range from 1.5 μm to 3 μm. For example, a thickness of the first resonant pattern 110 is 1.5 μm, 2 μm or 3 μm; and a thickness of the second resonant pattern 120 is 1.5 μm, 2.5 μm or 3 μm. The thicknesses of the first resonant pattern 110 and the second resonant pattern 120 may be the same or different, which may be set according to actual needs. For example, the thickness of the first resonant pattern 110 is 3 μm, and the thickness of the second resonant pattern 120 is 3 μm.

Figure 3:
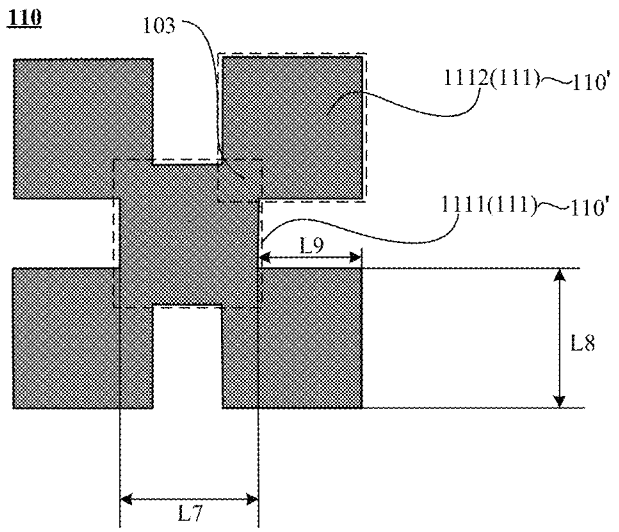
FIG. 3 is a diagram showing a structure of a first resonant pattern, in accordance with some embodiments.

In some embodiments, as shown in FIGS. 3, 4A and 4B, the first resonant pattern 110 is a fractal pattern. The plurality of protruding portions 110' of the first resonant pattern 110 may be classified into a plurality of stages of sub-portions 111, and protruding portions on edges of a sub-portion in a current stage are sub-portions in a next stage, except for a first stage of sub-portions 111, each stage of sub-portions 111 includes at least two sub-portions separated from each other, and the at least two sub-portions 111 included in each stage of sub-portions 111 have the same structure. That is, the at least two sub-portions 111 included in each stage of sub-portions 111 are all sub-portions 111 in the same stage. The first stage of sub-portions 111 includes a first-stage sub-portion as described below.

It will be understood that, the fractal pattern refers to an overall pattern with infinite self-similarity that is composed of an initial pattern and a plurality of patterns with similar structure to the initial pattern, the plurality of patterns are continuously developed from the initial pattern, and the self-similarity means that a structure of the initial pattern is reflected in each portion of the fractal pattern.

In view of a fact that the symmetrical pattern significantly improves filtering uniformity and communication quality of electromagnetic waves passing through different regions of the resonant pattern, a sub-portion 111 in an initial stage of the above fractal pattern is generally in a shape of an equilateral polygon, for example, the sub-portion 111 is in a shape of an equilateral triangle or a square.

In some examples, as shown in FIG. 3, the first resonant pattern 110 includes two stages of sub-portions 111, that is, the first resonant pattern 110 includes a first-stage sub-portion 1111 and second-stage sub-portions 1112. Protruding portions on edges of the first-stage sub-portion 1111 are the second-stage sub-portions 1112.

For example, the sub-portions 111 each have a rectangular structure, e.g., a square structure. As shown in FIG. 3, a shape of the first-stage sub-portion 1111 is square; and at each of four corners of the first-stage sub-portion 1111, a respective second-stage sub-portion 1112 protrudes outward. The second-stage sub-portions 1112 are connected to the first-stage sub-portion 1111. Here, the four second-stage sub-portions 1112 have the same shape and size, and the first-stage sub-portion 1111 and the second-stage sub-portions 1112 have the same size. It will be understood that, the second-stage sub-portions 1112 may also have different shapes and sizes, and the first-stage sub-portion 1111 and the second-stage sub-portions 1112 may also have different sizes, which may be set according to actual needs.

In some other examples, as shown in FIG. 4A, the first resonant pattern 110 includes three stages of sub-portions 111, that is, the first resonant pattern 110 includes a first-stage sub-portion 1111, second-stage sub-portions 1112 and third-stage sub-portions 1113. Protruding portions on edges of the first-stage sub-portion 1111 are the second-stage sub-portions 1112; protruding portions on edges of the second-stage sub-portions 1112 are the third-stage sub-portions 1113.

For example, as shown in FIG. 4A, a sub-portion 111 in each stage has a triangular structure, e.g., an equilateral triangular structure. The first-stage sub-portion 1111 is in a shape of an equilateral triangle, a protruding portion on each side of the first-stage sub-portion 1111 is a second-stage sub-portion 1112, and protruding portions on each of two sides of each second-stage sub-portion 1112 are two third-stage sub-portions 1113. In this way, the first resonant pattern 110 includes one first-stage sub-portion 1111, three second-stage sub-portions 1112 and six third-stage sub-portions 1113. The three second-stage sub-portions 1112 have the same shape and size, and the six third-stage sub-portions 1113 have the same shape and size.

In yet some other examples, as shown in FIGS. 3 and 4B, the first resonant pattern 110 includes a plurality of stages of sub-portions 111, and sub-portions 111 in a next stage may include portions of a sub-portion 111 in a current stage, and protruding portions on the sub-portion 111 in the current stage. That is, the sub-portion 111 in the current stage and the sub-portion 111 in the next stage share a portion, i.e., a shared portion 103.

For example, as shown in FIG. 3, second-stage sub-portions 1112 include portions of four corners of the first-stage sub-portion 1111. That is, in a case where the second-stage sub-portions 1112 includes shared portions 103, the second-stage sub-portions 1112 are each in a shape of a square and have the same structure as the first-stage sub-portion 1111.

For example, as shown in FIG. 4B, the second-stage sub-portions 1112 include portions of three corners of the first-stage sub-portion 1111. That is, shared portions 103 serve as second-stage sub-portions 1112, and protruding portions on the shared portions 103 are third-stage sub-portions 1113. In this way, in a case where protruding portions on two edges of each second-stage sub-portion 1112 are third-stage sub-portions 1113, there are twelve third-stage sub-portions 1113. The third-stage sub-portions 1113 that are on edges of the shared portion 103 and protrude outward are actually connected to the first-stage sub-portion 1111. Here, a size of the first-stage sub-portion 1111 is larger than a size of the second-stage sub-portion 1112, and the size of the second-stage sub-portion 1112 (or a size of the shared portion 103) is larger than a size of the third-stage sub-portion 1113. The three second-stage sub-portions 1112 (and the three shared portions 103) have the same shape and size, and the twelve third-stage sub-portions 1113 have the same shape and size.

It will be noted that the fractal pattern as shown in FIG. 4B is a snowflake-like pattern, and in the following embodiments, the snowflake-like fractal pattern is used to represent the first resonant pattern 110 obtained after a fractal process based on the initial pattern that is in a shape of an equilateral triangle.

Figure 5A:
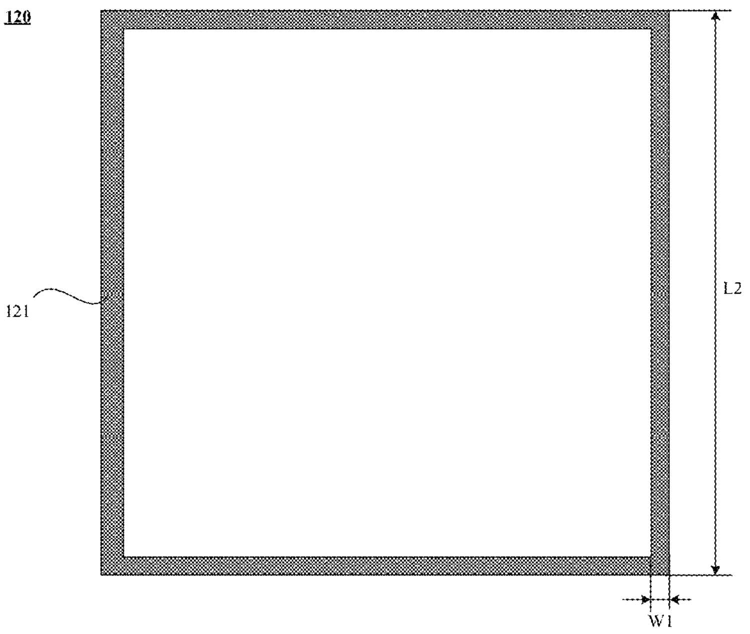
FIG. 5A is a diagram showing a structure of a second resonant pattern, in accordance with some embodiments.
Figure 5B:
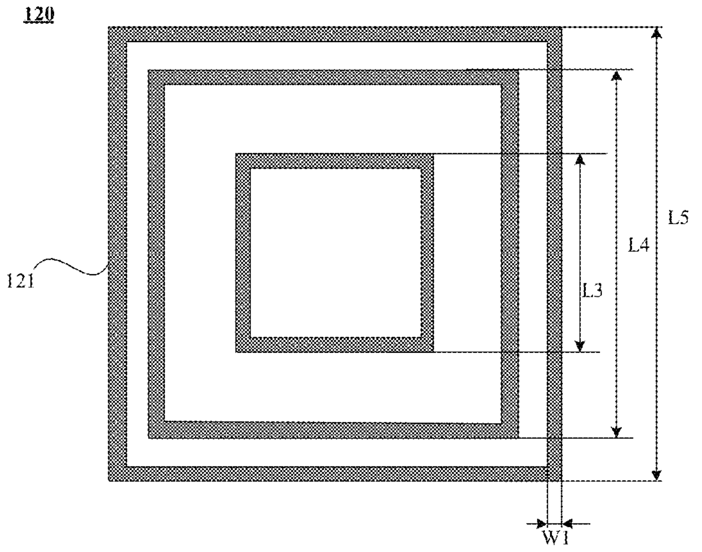
FIG. 5B is a diagram showing a structure of another second resonant pattern, in accordance with some embodiments.

In some embodiments, as shown in FIGS. 5A and 5B, the second resonant pattern 120 includes a rectangular ring 121; or the second resonant pattern 120 includes at least two rectangular rings 121, centers of the at least two rectangular rings 121 overlap, and the at least two rectangular rings 121 have a distance therebetween.

For example, the rectangular ring 121 is a square ring. A size of the rectangular ring 121 may be designed according to a passband frequency range and a passband bandwidth of the second resonant pattern 120, and a size of the dielectric substrate 101 may be designed according to a size of the largest rectangular ring.

In some examples, the second resonant pattern 120 includes the at least two rectangular rings 121. As shown in FIG. 5B, the second resonant pattern 120 includes three nested rectangular rings 121, the three nested rectangular rings 121 have a distance therebetween, and the distance (or respective side lengths and widths of the three rectangular rings 121) is related to the passband frequency range of the second resonant pattern 120.

Figure 6:
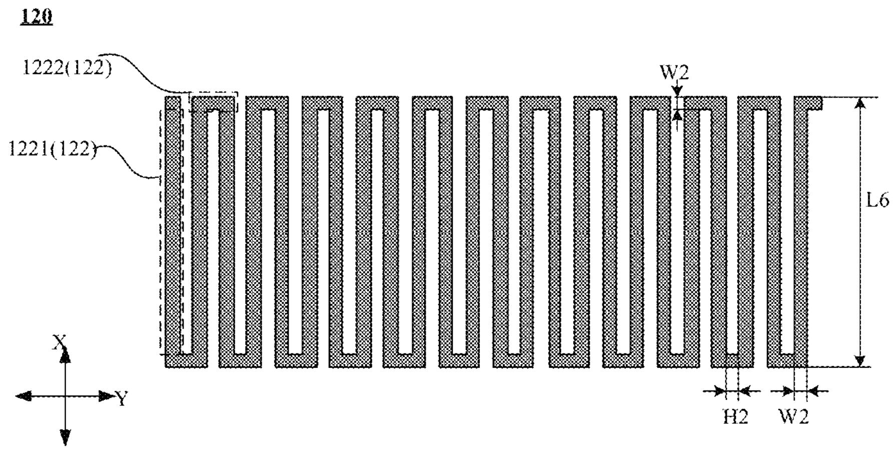
FIG. 6 is a diagram showing a structure of yet another second resonant pattern, in accordance with some embodiments.

In some other embodiments, as shown in FIG. 6, the second resonant pattern 120 is a serpentine structure 122. The serpentine structure 122 includes a plurality of first extending portions 1221 and a plurality of second extending portions 1222. The plurality of first extending portions 1221 are parallel to each other, an extension direction of the first extending portions 1221 intersects an extension direction of the second extending portions 1222, and two adjacent first extending portions 1221 are connected to each other by one second extending portion 1222.

For example, as shown in FIG. 6, each of the plurality of first extending portions 1221 extends in a first direction X, and the plurality of first extending portions 1221 are arranged at intervals in a second direction Y. Each of the plurality of second extending portions 1222 extends in the second direction Y. Two adjacent second extending portions 1222 in the second direction Y are connected to two ends of a first extending portion 1221 in the second direction Y, respectively. That is, there is a distance between the two adjacent second extending portions 1222 in the second direction Y. The first direction X and the second direction Y intersect. For example, the first direction X and the second direction Y are perpendicular to each other.

A distance between any two adjacent first extending portions 1221 may be equal or unequal. For example, the distance H2 between any two adjacent first extending portions 1221 is equal, and lengths of the plurality of second extending portions 1222 in the second direction Y are equal. In addition, as shown in FIG. 6, widths W2 of the plurality of first extending portions 1221 and the plurality of second extending portions 1222 are equal. In this way, the plurality of first extending portions 1221 are regularly distributed, and electromagnetic waves can be evenly transmitted through the serpentine structure 122, which is conducive to improving the communication quality.

As shown in FIGS. 7 to 24, the first resonant pattern 110 and the second resonant pattern 120 may be arranged on the dielectric substrate 101 in any combination, which may be set according to the passband frequency range of the frequency selective surface unit 100.

Figure 9:
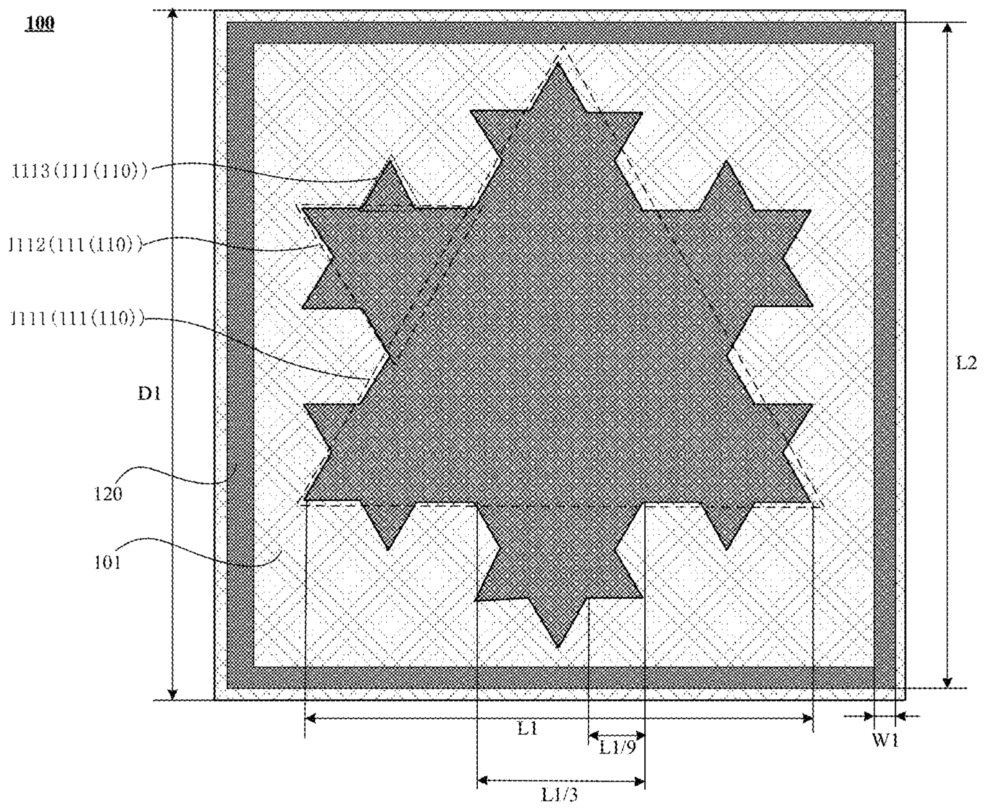
FIG. 9 is a diagram showing a structure of yet another frequency selective surface unit, in accordance with some embodiments.

As shown in FIGS. 7 and 9, in some examples, the first resonant pattern 110 and the second resonant pattern 120 are disposed on the same surface of the dielectric substrate 101, and the second resonant pattern 120 surrounds the first resonant pattern 110. The first resonant pattern 110 is the snowflake-like fractal pattern, and the second resonant pattern 120 includes one rectangular ring 121.

As shown in FIG. 8, in some other examples, the first resonant pattern 110 and the second resonant pattern 120 are disposed on the two opposite surfaces of the dielectric substrate 101, respectively; and an orthographic projection of the first resonant pattern 110 on the dielectric substrate 101 does not overlap with an orthographic projection of the second resonant pattern 120 on the dielectric substrate 101. The first resonant pattern 110 is the snowflake-like fractal pattern, and the second resonant pattern 120 includes one rectangular ring 121.

As shown in FIGS. 10 to 17, in yet some other examples, the second resonant pattern 120 and the first resonant pattern 110 are disposed on the two opposite surfaces of the dielectric substrate 101, respectively. The orthographic projection of the second resonant pattern 120 on the dielectric substrate 101 partially overlaps with the orthographic projection of the first resonant pattern 110 on the dielectric substrate 101.

Figure 10:
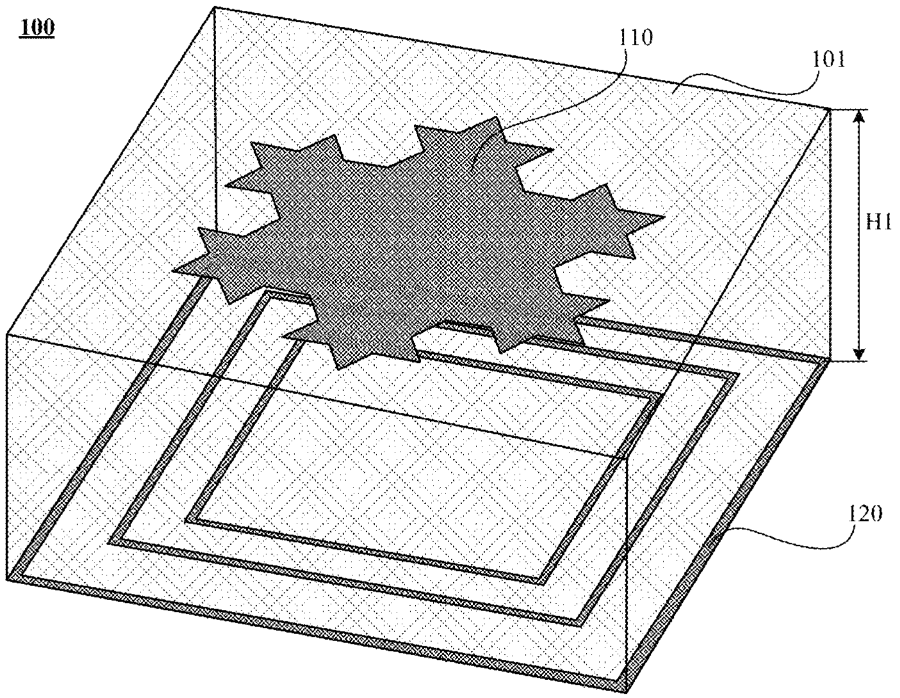
FIG. 10 is a diagram showing a structure of yet another frequency selective surface unit, in accordance with some embodiments.
Figure 11:
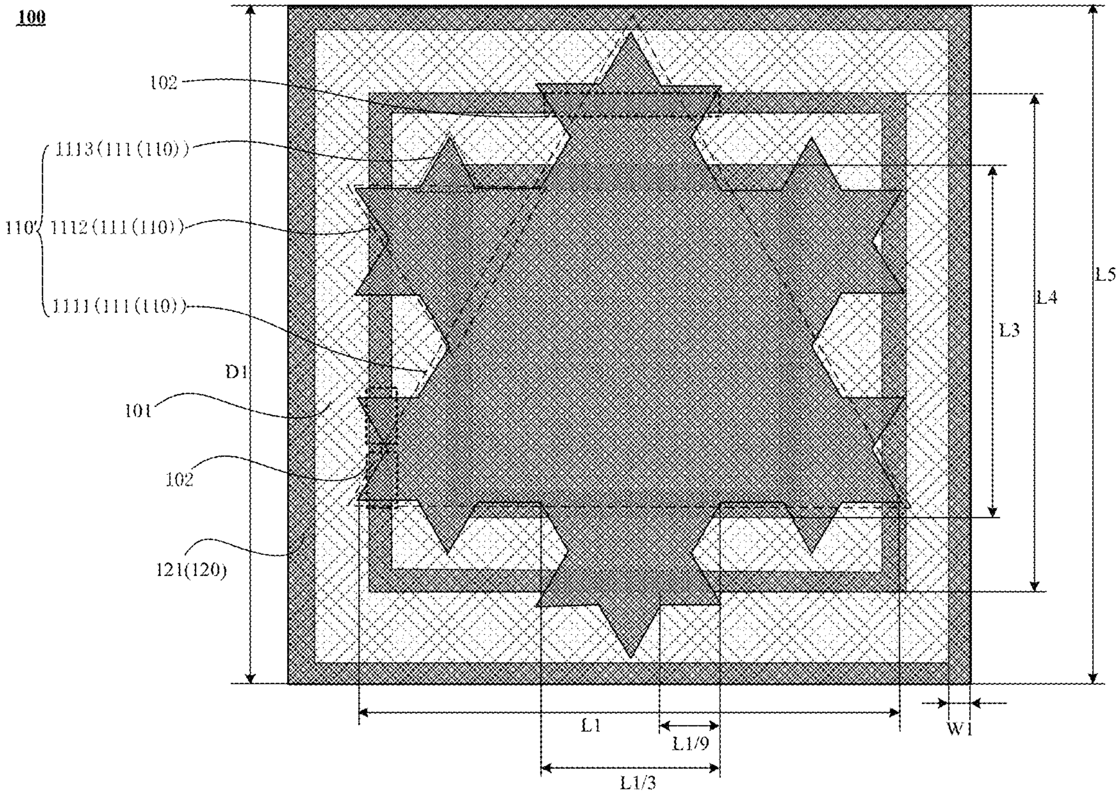
FIG. 11 is a diagram showing a structure of yet another frequency selective surface unit, in accordance with some embodiments.

For example, as shown in FIGS. 10 and 11, the first resonant pattern 110 is the snowflake-like fractal pattern; for three rectangular rings 121 of the second resonant pattern 120 whose centers overlap, in a direction from inside to outside, an orthographic projection of the innermost rectangular ring 121 on the dielectric substrate 101 partially overlaps with an orthographic projection of the first resonant pattern 110 on the dielectric substrate 101, an orthographic projection of the middle rectangular ring 121 on the dielectric substrate 101 partially overlaps with the orthographic projection of the first resonant pattern 110 on the dielectric substrate 101, and an orthographic projection of the outermost rectangular ring 121 on the dielectric substrate 101 does not overlap with the orthographic projection of the first resonant pattern 110 on the dielectric substrate 101.

Figure 12:
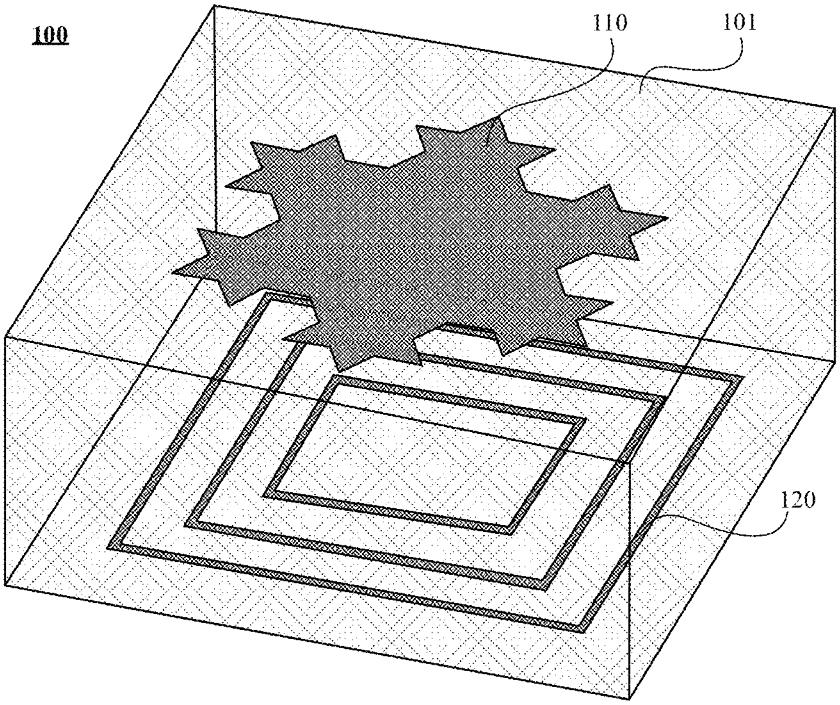
FIG. 12 is a diagram showing a structure of yet another frequency selective surface unit, in accordance with some embodiments.
Figure 13:
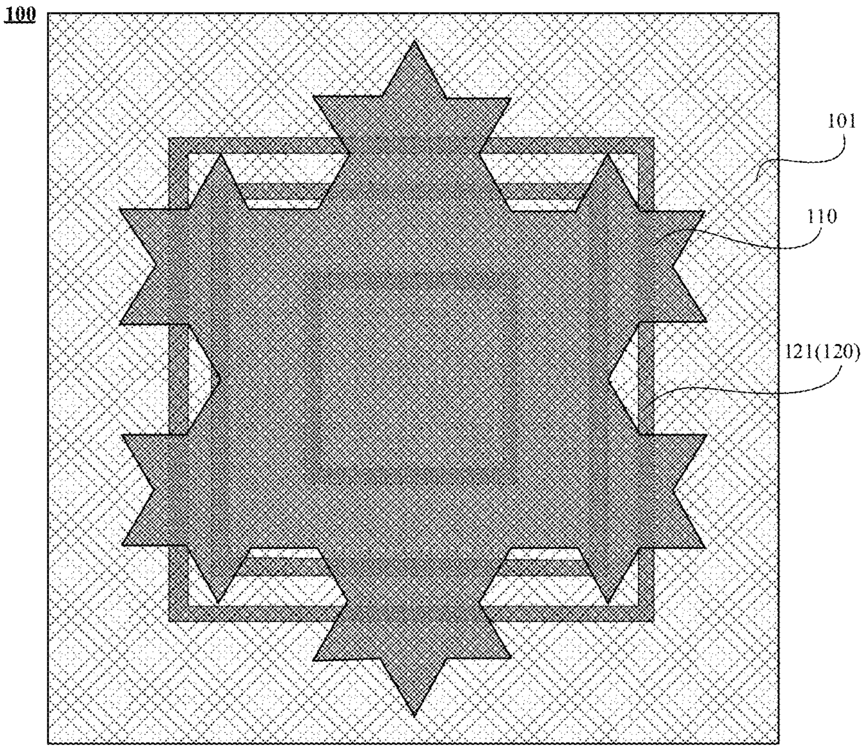
FIG. 13 is a diagram showing a structure of yet another frequency selective surface unit, in accordance with some embodiments.

For example, as shown in FIGS. 12 and 13, the first resonant pattern 110 is the snowflake-like fractal pattern; for three rectangular rings 121 of the second resonant pattern 120 whose centers overlap, an orthographic projection of each rectangular ring 121 on the dielectric substrate 101 is partially overlapped with the orthographic projection of the first resonant pattern 110 on the dielectric substrate 101.

Figure 14:
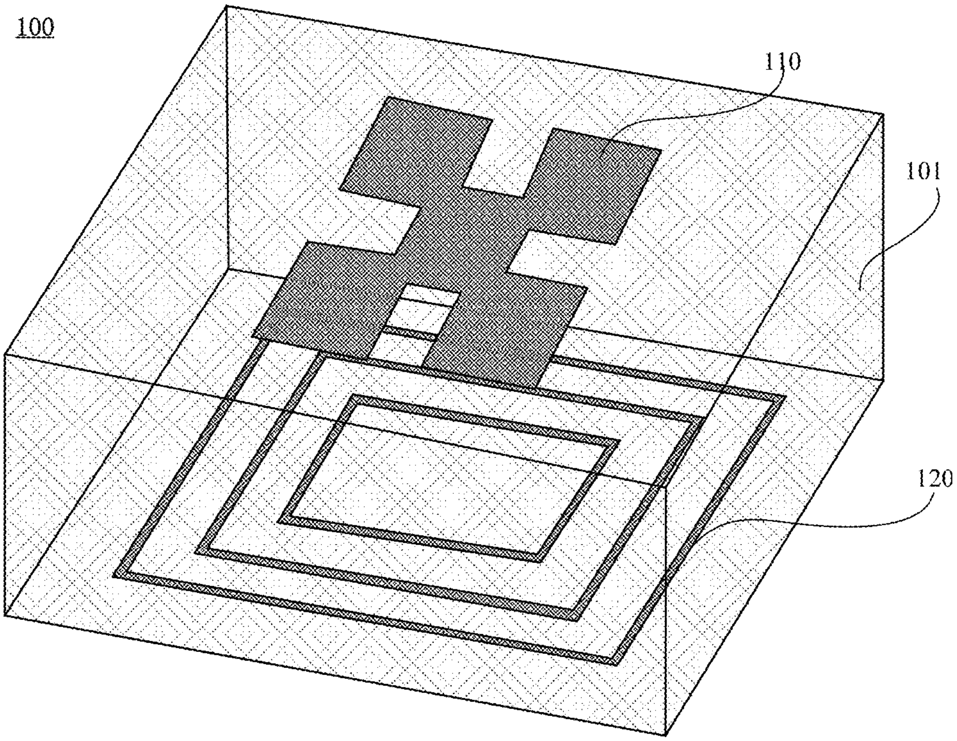
FIG. 14 is a diagram showing a structure of yet another frequency selective surface unit, in accordance with some embodiments.
Figure 15:
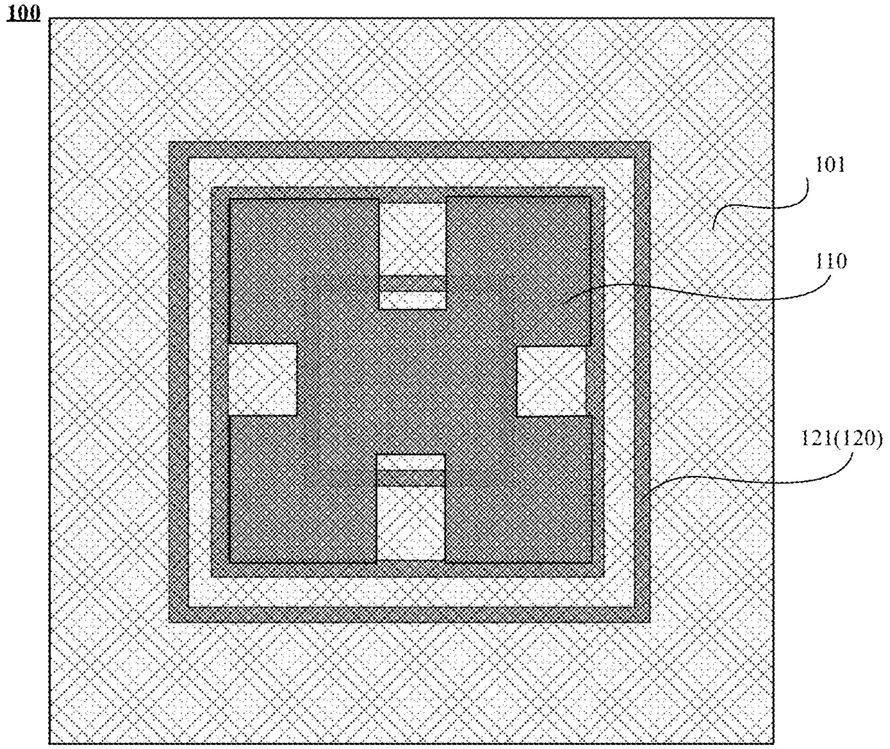
FIG. 15 is a diagram showing a structure of yet another frequency selective surface unit, in accordance with some embodiments.

For example, as shown in FIGS. 14 and 15, the first resonant pattern 110 is a checkered fractal pattern, i.e., a structure obtained after a fractal process based on the initial pattern that is in a shape of a square. For three rectangular rings 121 of the second resonant pattern 120 whose centers overlap, in the direction from inside to outside, the orthographic projection of the innermost rectangular ring 121 on the dielectric substrate 101 partially overlap with orthographic projection of the first resonant pattern 110 on the dielectric substrate 101, the orthographic projection of the middle rectangular ring 121 on the dielectric substrate 101 partially overlap with the orthographic projection of the first resonant pattern 110 on the dielectric substrate 101, and the orthographic projection of the outermost rectangular ring 121 on the dielectric substrate 101 does not overlap with the orthographic projection of the first resonant pattern 110 on the dielectric substrate 101.

Figure 16:
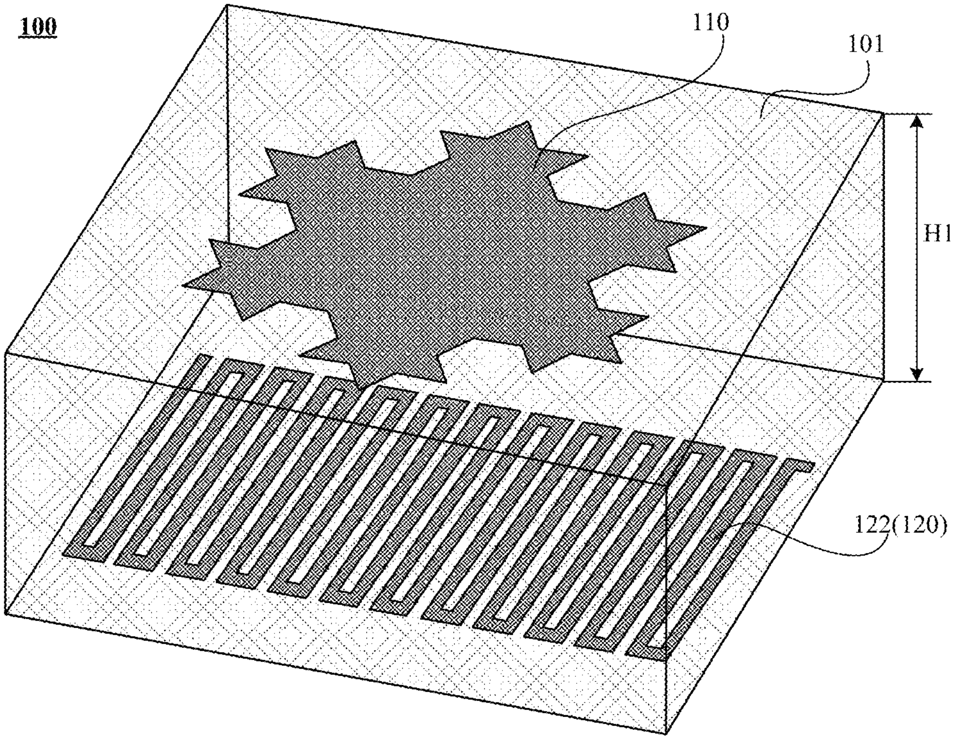
FIG. 16 is a diagram showing a structure of yet another frequency selective surface unit, in accordance with some embodiments.
Figure 17:
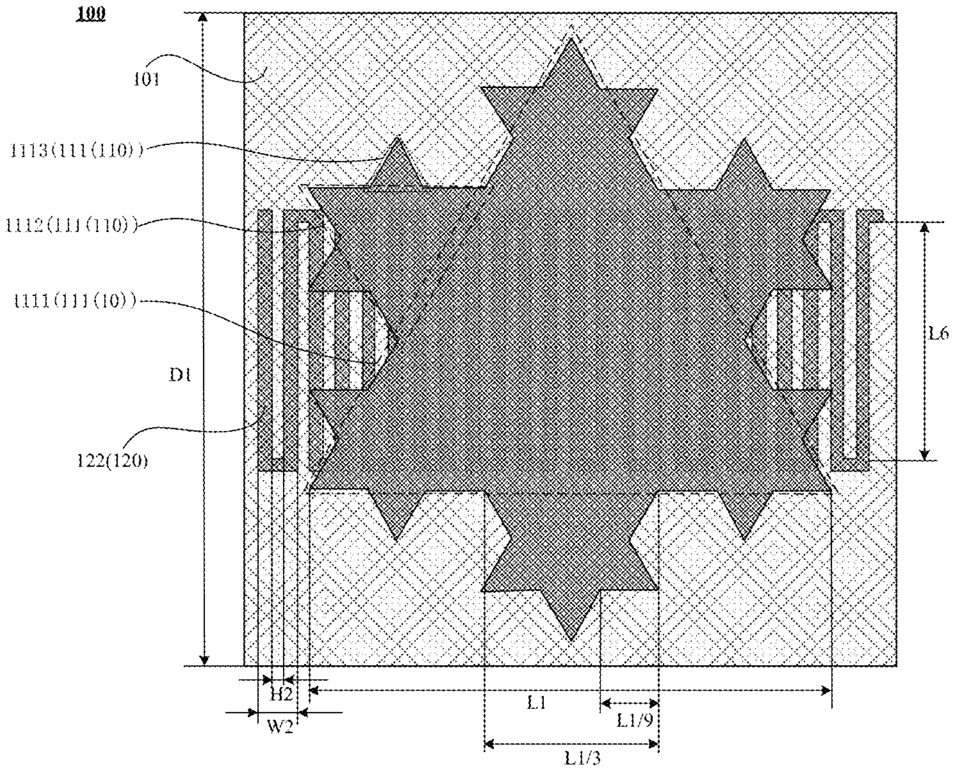
FIG. 17 is a diagram showing a structure of yet another frequency selective surface unit, in accordance with some embodiments.

For example, as shown in FIGS. 16 and 17, the first resonant pattern 110 is the snowflake-like fractal pattern, and the second resonant pattern 120 is the serpentine structure 122. The orthographic projection of the first resonant pattern 110 on the dielectric substrate 101 partially overlaps with an orthographic projection of at least one first extending portion 1221 on the dielectric substrate 101.

In a case where the frequency selective surface unit 100 provided in the above examples includes a single dielectric substrate 101, a single first resonant pattern 110 and a single second resonant pattern 120, the combination of the first resonant pattern 110 and the second resonant pattern 120 varies, and different combinations reflect that the frequency selective surface unit 100 may have different passband frequency ranges. In addition, as shown in FIGS. 18 to 24, the frequency selective surface unit 100 may include: a plurality of dielectric substrates 101 that are arranged in a stack, a plurality of first resonant patterns 110 and a plurality of second resonant patterns 120. Therefore, by increasing the number of the dielectric substrates 101 that are arranged in a stack and the number of resonant patterns, the passband frequency range of the frequency selective surface unit 100 may further be increased.

In some embodiments, as shown in FIGS. 18 to 24, in a case where the frequency selective surface unit 100 includes the plurality of dielectric substrates 101 that are arranged in a stack, the first resonant patterns 110 and the second resonant patterns 120 are alternately arranged in the direction perpendicular to the dielectric substrate 101, and at least one dielectric substrate 101 is arranged between a first resonant pattern 110 and a second resonant pattern 120 that are adjacent.

It will be understood that, in a case where a thickness of the dielectric substrate 101 is small, the plurality of dielectric substrates 101 that are arranged in a stack may be provided, so as to enhance a rigid support effect of the dielectric substrates 101. In addition, a thickness of the overall dielectric substrates 101 is large, which facilitates the steepness at the junction of the passband and a stopband of the frequency selective surface unit 100. That is, the frequency selective surface unit 100 has good edge steepness. For example, two dielectric substrates 101 are arranged between the first resonant pattern 110 and the second resonant pattern 120 that are adjacent; or three dielectric substrates 101 are arranged between the first resonant pattern 110 and the second resonant pattern 120 that are adjacent; or four dielectric substrates 101 are arranged between the first resonant pattern 110 and the second resonant pattern 120 that are adjacent.

Figure 18:
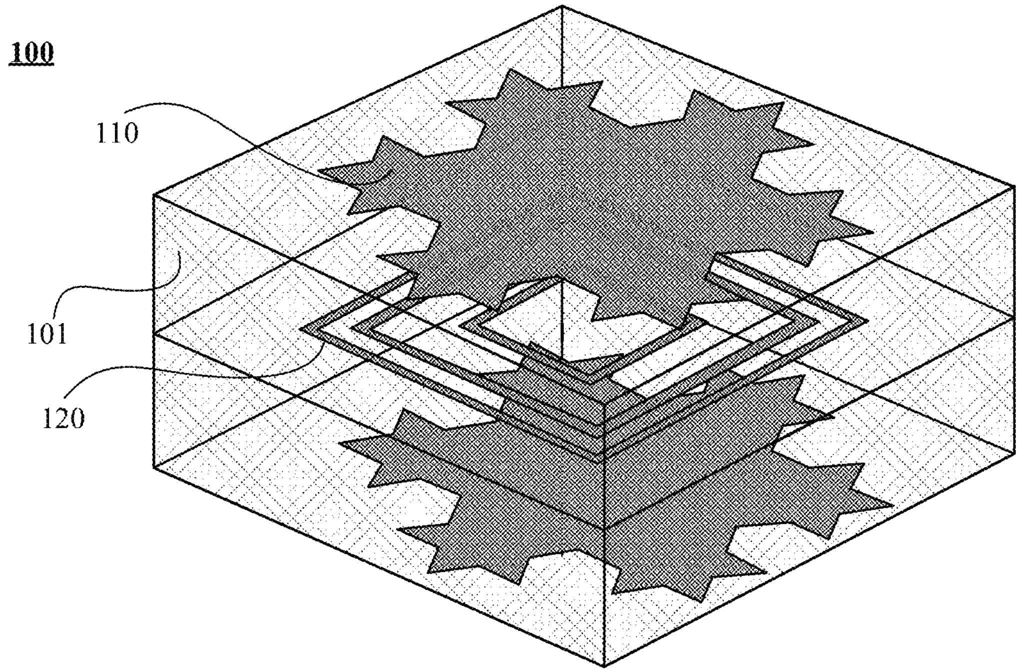
FIG. 18 is a diagram showing a structure of yet another frequency selective surface unit, in accordance with some embodiments.

In some examples, as shown in FIG. 18, the frequency selective surface unit 100 includes two dielectric substrates 101 that are arranged in a stack. Based on this, by taking an example in which a first resonant pattern 110 is arranged on an outermost surface (shown as an upper surface) of an outermost dielectric substrate 101 of the frequency selective surface unit 100 in the direction perpendicular to the dielectric substrate 101, the frequency selective surface unit 100 further includes two first resonant patterns 110 and one second resonant pattern 120. One dielectric substrate 101 is disposed between one first resonant pattern 110 and one second resonant pattern 120 that are adjacent. That is, in the direction perpendicular to the dielectric substrate 101, the frequency selective surface unit 100 includes a first first resonant pattern 110, a first dielectric substrate 101, a first second resonant pattern 120, a second dielectric substrate 101 and a second first resonant pattern 110.

Figure 19:
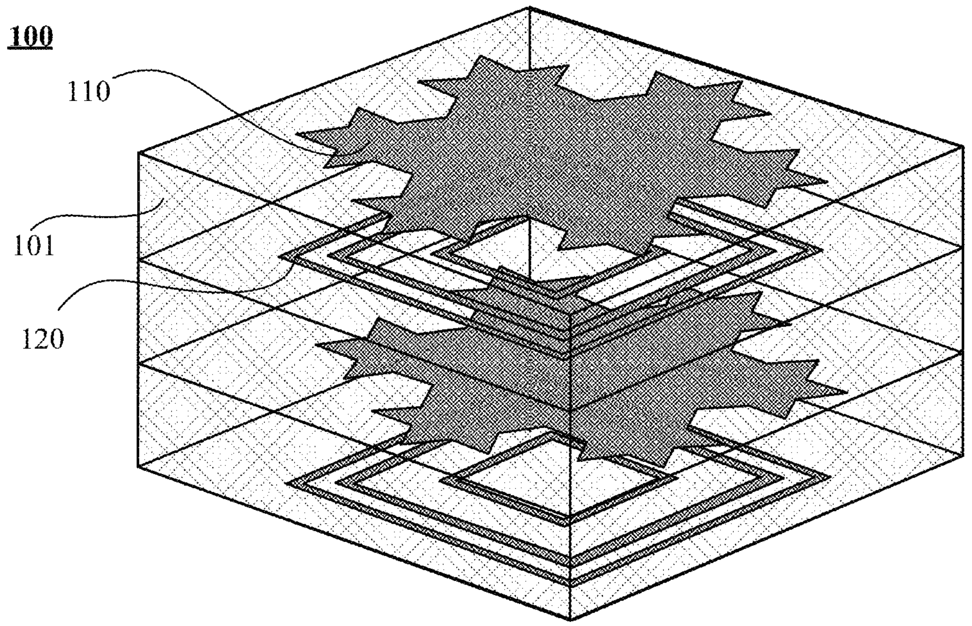
FIG. 19 is a diagram showing a structure of yet another frequency selective surface unit, in accordance with some embodiments.

In some examples, as shown in FIG. 19, the frequency selective surface unit 100 includes three dielectric substrates 101 that are arranged in a stack. Based on this, by taking an example in which a first resonant pattern 110 is arranged on the outermost surface (shown as the upper surface) of the outermost dielectric substrate 101 of the frequency selective surface unit 100 in the direction perpendicular to the dielectric substrate 101, the frequency selective surface unit 100 further includes two first resonant patterns 110 and two second resonant patterns 120. One dielectric substrate 101 is disposed between one first resonant pattern 110 and one second resonant pattern 120 that are adjacent. That is, in the direction perpendicular to the dielectric substrate 101, the frequency selective surface unit 100 includes a first first resonant pattern 110, a first dielectric substrate 101, a first second resonant pattern 120, a second dielectric substrate 101, a second first resonant pattern 110, a third dielectric substrate 101 and a second second resonant pattern 120.

Figure 20:
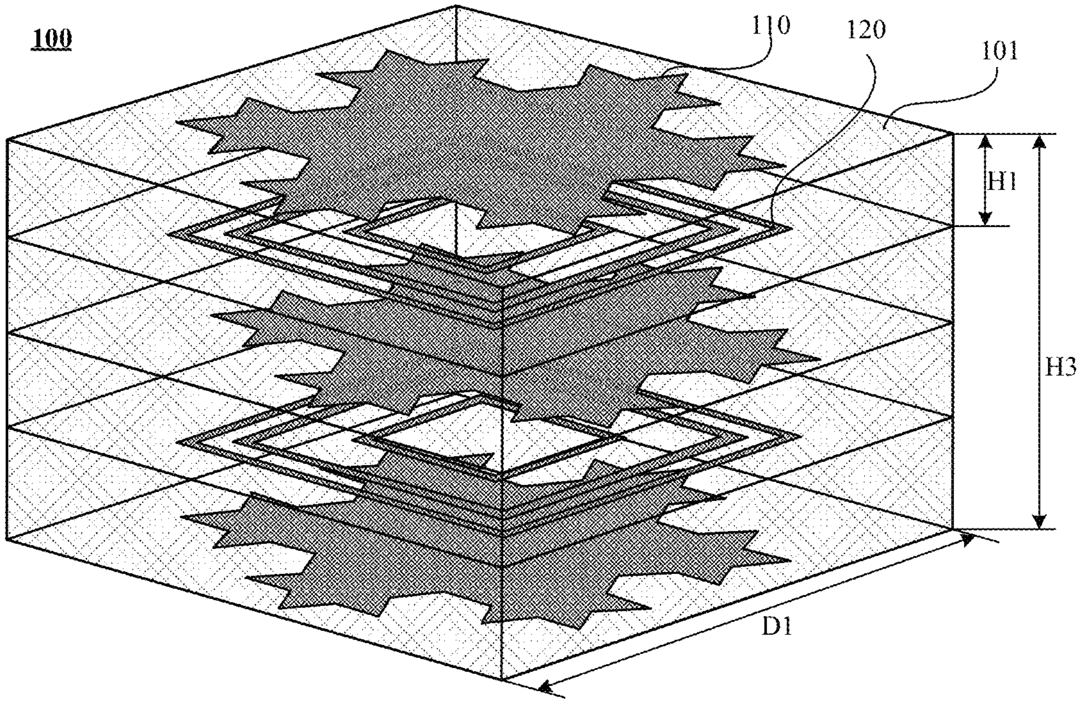
FIG. 20 is a diagram showing a structure of yet another frequency selective surface unit, in accordance with some embodiments.
Figure 21:
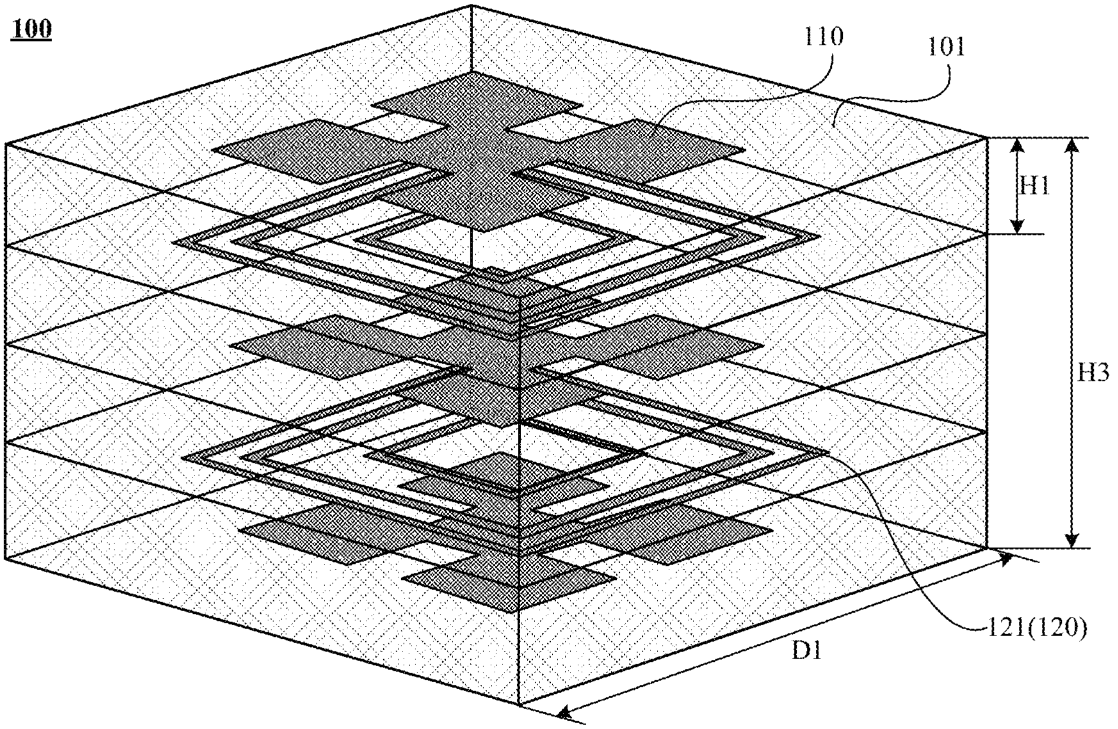
FIG. 21 is a diagram showing a structure of yet another frequency selective surface unit, in accordance with some embodiments.
Figure 22:
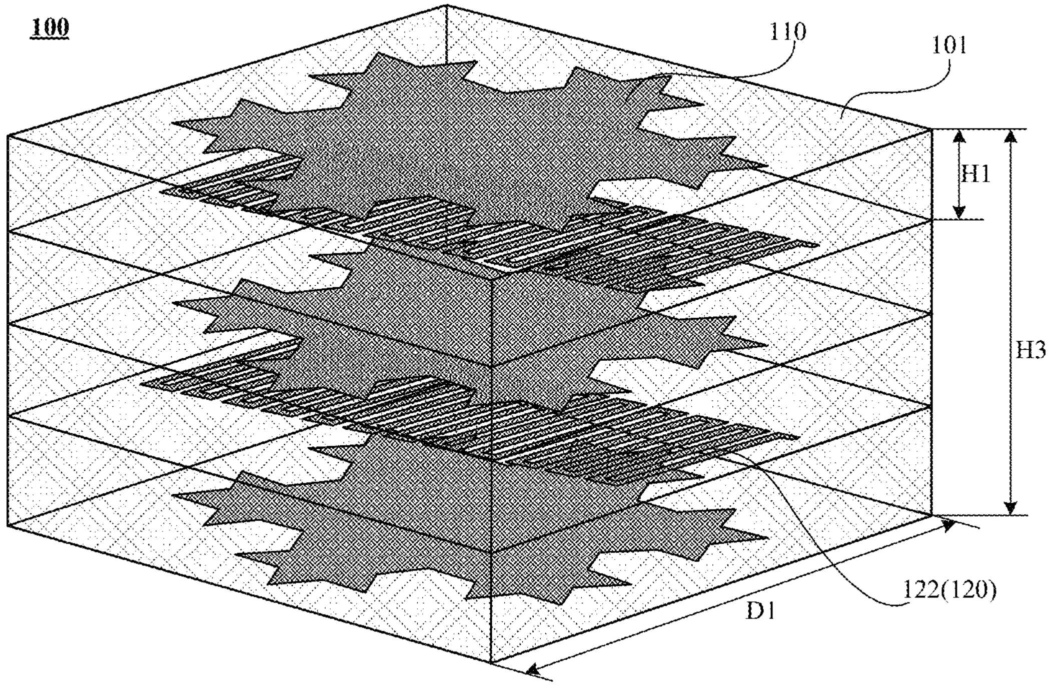
FIG. 22 is a diagram showing a structure of yet another frequency selective surface unit, in accordance with some embodiments.

In some examples, as shown in FIGS. 20 to 22, the frequency selective surface unit 100 includes four dielectric substrates 101 arranged in a stack. Based on this, by taking an example in which a first resonant pattern 110 is arranged on the outermost surface (shown as the upper surface) of the outermost dielectric substrate 101 of the frequency selective surface unit 100 in the direction perpendicular to the dielectric substrate 101, the frequency selective surface unit 100 further includes three first resonant patterns 110 and two second resonant patterns 120. One dielectric substrate 101 is arranged between one first resonant pattern 110 and one second resonant pattern 120 that are adjacent. That is, in the direction perpendicular to the dielectric substrate 101, the frequency selective surface unit 100 includes a first first resonant pattern 110, a first dielectric substrate 101, a first second resonant pattern 120, a second dielectric substrate 101, a second first resonant pattern 110, a third dielectric substrate 101, a second second resonant pattern 120, a fourth dielectric substrate 101 and a third first resonant pattern 110.

In the above examples, resonant patterns (i.e., a first resonant pattern 110 and a second resonant pattern 120) on two opposite surfaces of each dielectric substrate 101 are different, and under action of both the first resonant pattern 110 and the second resonant pattern 120 that are adjacent, the number of resonant points is increased and the passband frequency range is widened. In addition, under combined action of four dielectric substrates 101 that are arranged in a stack, and the first resonant pattern 110 and the first resonant pattern 120 that are disposed on the two opposite surfaces of each dielectric substrate 101, the number of resonant points of the frequency selective surface unit 100 is greater than a sum of the numbers of respective resonant points generated by four individual frequency selective surface units 100 in an electric field. In this way, the dielectric substrates 101 arranged in a stack and the first resonant patterns 110 and the second resonant patterns 120 further widen the passband frequency range of the frequency selective surface unit 100 and increase the passband bandwidth of the frequency selective surface structure 1001.

In some embodiments, as shown in FIGS. 18 to 24, in a case where the frequency selective surface unit 100 includes the plurality of dielectric substrates 101 arranged in a stack, the plurality of first resonant patterns 110 and the plurality of second resonant patterns 120, the plurality of first resonant patterns 110 have the same structure, and/or the plurality of second resonant patterns 120 have the same structure.

Figure 23:
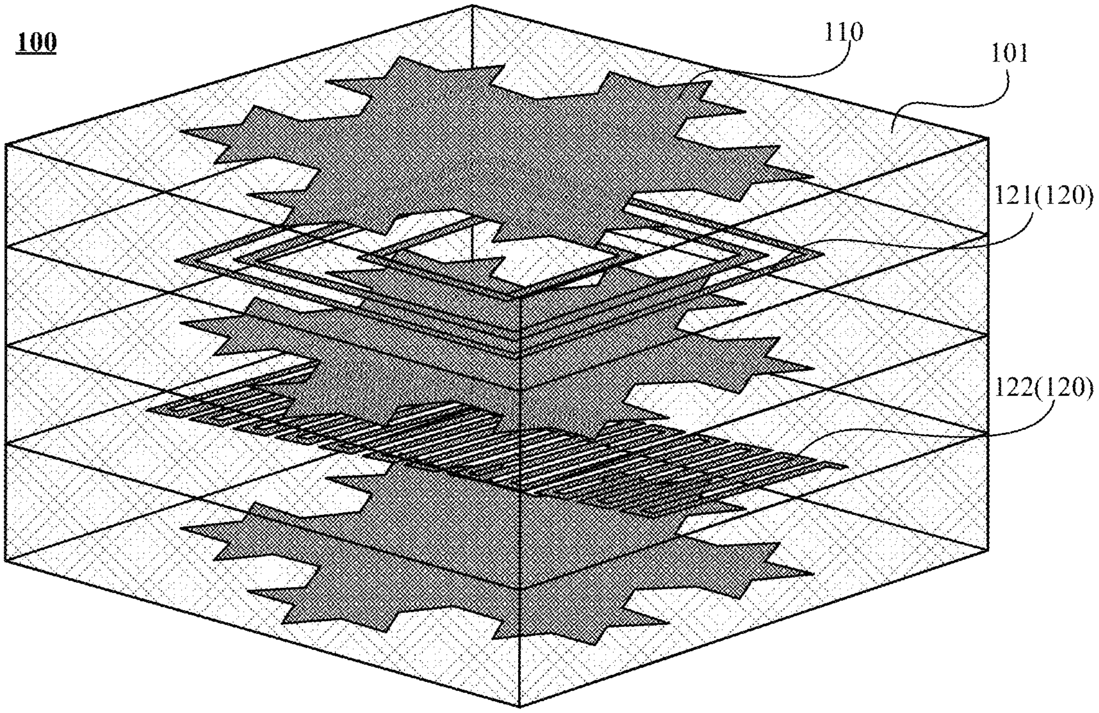
FIG. 23 is a diagram showing a structure of yet another frequency selective surface unit, in accordance with some embodiments.

For example, as shown in FIGS. 18 to 23, the plurality of first resonant patterns 110 have the same shape and size, and the plurality of second resonant patterns 120 may have the same shape and size or different shapes and sizes. As shown in FIG. 23, the two second resonant patterns 120 have different shapes and sizes, one second resonant pattern 120 includes three rectangular rings 121 whose centers overlap, and the other second resonant pattern 120 is the serpentine structure 122.

Figure 24:
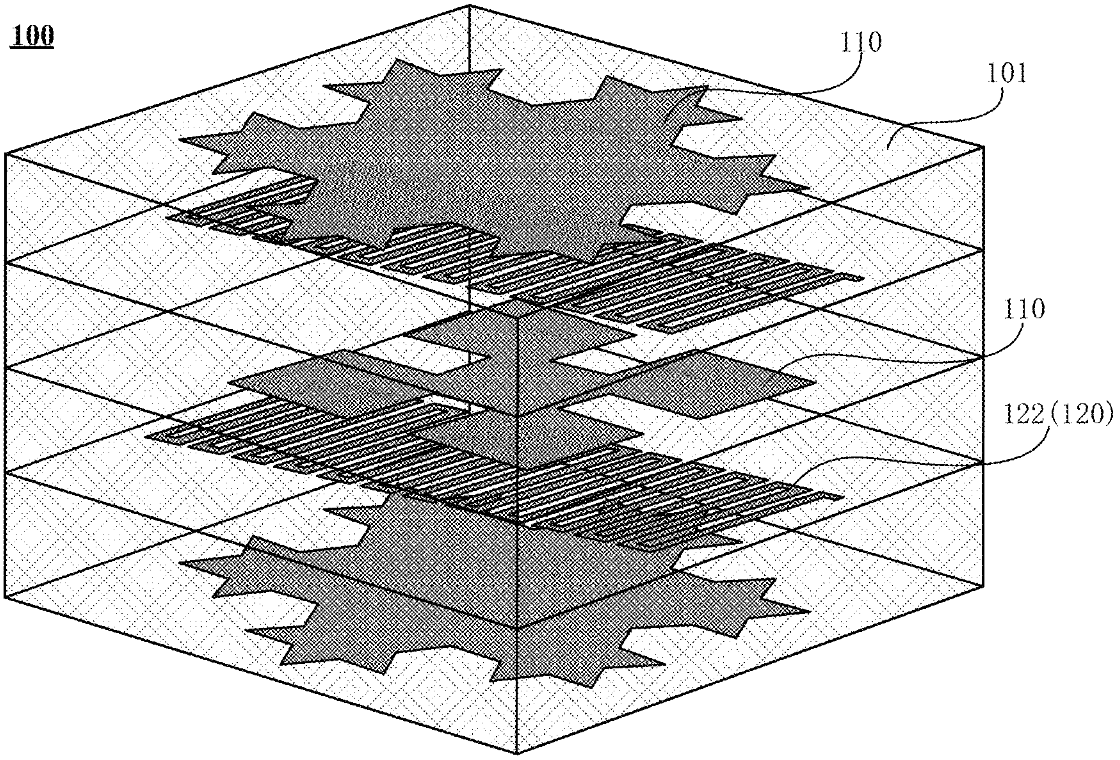
FIG. 24 is a diagram showing a structure of yet another frequency selective surface unit, in accordance with some embodiments.

For example, as shown in FIGS. 18 to 22 and 24, the plurality of second resonant patterns 120 have the same shape and size, and the plurality of first resonant patterns 110 may have the same shape and size or different shapes and sizes. As shown in FIG. 24, one first resonant pattern 110 in the three first resonant patterns 110 is a fractal pattern based on a square, and two first resonant patterns 110 in the three first resonant patterns 110 are fractal patterns based on an equiangular triangle, and the two fractal patterns based on an equiangular triangle have the same size, and the fractal patterns based on the equiangular triangle do not have the same size as the fractal pattern based on the square.

For example, as shown in FIGS. 18 to 22, the plurality of first resonant patterns 110 have the same shape and size, and the plurality of second resonant patterns 120 have the same shape and size.

In some embodiments, as shown in FIG. 11, the orthographic projection of the first resonant pattern 110 on the dielectric substrate 101 partially overlaps with the orthographic projection of the second resonant pattern 120 on the dielectric substrate 101, and overlapping portions of the orthographic projections of the first resonant pattern 110 and the second resonant pattern 120 on the dielectric substrate 101 include a plurality of overlapping regions 102 that are separated from each other.

For example, with continued reference to FIG. 11, the first resonant pattern 110 is a fractal pattern based on an equiangular triangle, and the second resonant pattern 120 includes three rectangular rings 121 whose centers overlap. Since the first resonant pattern 110 and the second resonant pattern 120 have different shapes, orthographic projections of the plurality of protruding portions 110' of the first resonant pattern 110 on the dielectric substrate 101 partially overlap with orthographic projections of the rectangular rings 121 on the dielectric substrate 101, instead of completely overlapping (boundaries of the orthographic projections overlap). As a result, there are the plurality of overlapping regions 102 separated from each other. The overlapping portions 102 are similarly regarded as positions of resonant points generated by the coupling of the first resonant pattern 110 and the second resonant pattern 120 due to the action of the electric field. In this way, by setting shapes and sizes of the first resonant pattern 110 and the second resonant pattern 120, the number of the overlapping portions 102 is increased, which is conducive to widening the passband frequency range of the frequency selective surface unit 100. Thus, the bandwidth of the frequency selective surface structure 1001 is increased.

In combination with the frequency selective surface unit 100 provided in any of the above embodiments, the present disclosure uses a high frequency structure simulator (HFSS) to conduct simulation experiments on different embodiments. As shown in FIGS. 7, 9 to 11, 16, 17, and 20 to 22, the frequency selective surface unit 100 includes at least one dielectric substrate 101, at least one first resonant pattern 110 and at least one second resonant pattern 120. The material of the dielectric substrate 101 includes PET, the materials of the first resonant pattern 110 and the second resonant pattern 120 each include Cu, and the thicknesses of the first resonant pattern 110 and the second resonant pattern 120 are each 3 μm. In addition, as shown in FIGS. 25 to 30, the horizontal axis represents a range of frequencies of electromagnetic waves, and the vertical axis S21 represents insertion losses of the electromagnetic waves passing through the frequency selective surface unit 100. When an insertion loss of an electromagnetic wave reaches a certain value, the electromagnetic wave with a frequency cannot pass through the frequency selective surface unit 100. Considering an example in which a cutoff frequency is −3 dB, electromagnetic waves whose frequencies are greater than −3 dB can pass through the frequency selective surface unit 100. Therefore, the passband frequency ranges of different frequency selective surface units 100 are tested.

In a specific example, as shown in FIGS. 7 and 9, the frequency selective surface unit 100 includes one dielectric substrate 101, one first resonant pattern 110 and one second resonant pattern 120. The first resonant pattern 110 and the second resonant pattern 120 are disposed on the same surface of the dielectric substrate 101. A thickness H1 of the dielectric substrate 101 is 200 μm. In this way, the entire frequency selective surface unit 100 has a thickness of 206 μm, which achieves the low profile of the frequency selective surface unit 100. In addition, an upper surface of the dielectric substrate 101 has a square structure with a side length D1 of 6 mm. A size of the dielectric substrate 101 is small, which is conducive to achieving the miniaturization of the frequency selective surface units 100 with the same passband frequency range, and widening an application range of frequency selective surface structures 1001 on small-sized electronic devices 1000.

The first resonant pattern 110 is the fractal pattern based on an equilateral triangle and includes the sub-portions 111 in the three stages. A side length L1 of the first-stage sub-portion 1111 is 4 mm, side lengths of the second-stage sub-portions 1112 are L1 divided by 3 (L1/3) mm, and side lengths of the third-stage sub-portions are L1 divided by 9 (L1/9) mm. The second resonant pattern 120 includes one square ring 121, a side length L2 of the square ring 121 is 5.8 mm, and a width W1 of the square ring 121 is 0.2 mm.

Figure 25:
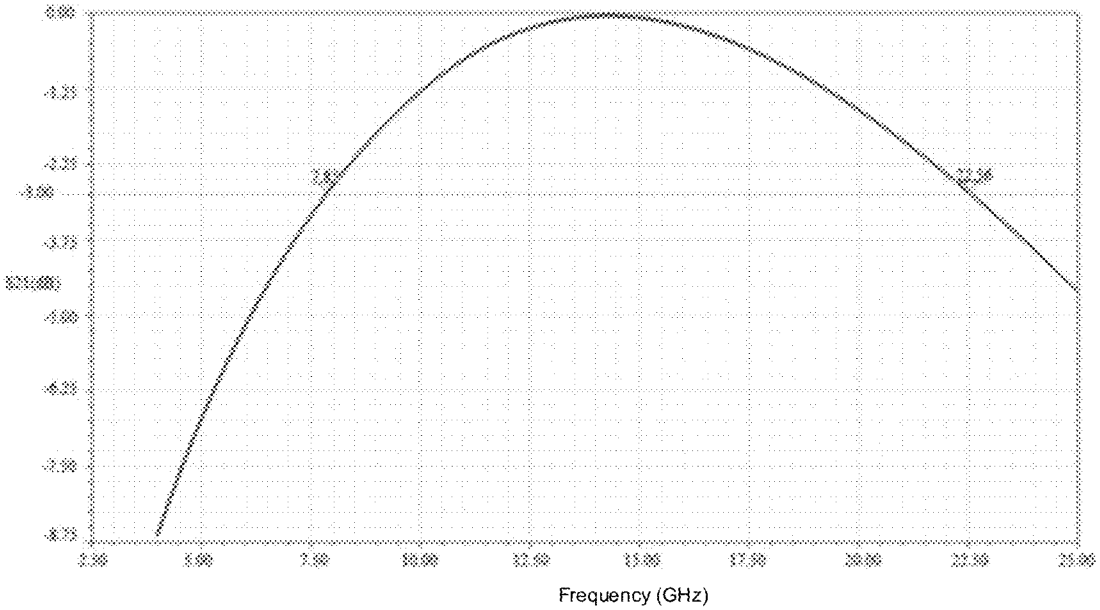
FIG. 25 is a diagram showing a simulation result of a frequency selective surface unit, in accordance with FIGS. 7 and 9.

The HFSS simulation result is as shown in FIG. 25. The frequency selective surface unit 100 provided in this example has a passband of 7.85 GHz to 22.56 GHz, a bandwidth of 14.71 GHz, a center frequency of 15.2 GHz and a relative bandwidth of 97%, which achieves ultra-wideband (UWB) transmission. In addition, as shown in FIG. 25, a junction of the range of the frequencies of the electromagnetic waves passing through the frequency selective surface unit 100 and the cutoff frequency of −3 dB (a frequency of 7.85 GHz or 22.56 GHz in the passband) reflects the steepness of the passband and the stopband. That is, a slope is large, and an edge of the passband has an edge steep drop characteristic, which realizes good out-of-band suppression performance of the frequency selective surface unit 100 and reduces the impact of clutter on the communication quality.

It will be noted that the relative bandwidth is a ratio of the passband bandwidth to the center frequency. A bandwidth of a passband with a relative bandwidth of 1% to 25% is a narrowband bandwidth known to those skilled in the art, a bandwidth of a passband with a relative bandwidth greater than 25% is a UWB bandwidth known to those skilled in the art.

In another specific example, as shown in FIGS. 10 and 11, the frequency selective surface unit 100 includes one dielectric substrate 101, one first resonant pattern 110 and one second resonant pattern 120. The first resonant pattern 110 and the second resonant pattern 120 are disposed on the two opposite surfaces of the dielectric substrate 101, respectively, and the orthographic projection of the first resonant pattern 110 on the dielectric substrate 101 partially overlaps with the orthographic projection of the second resonant pattern 120 on the dielectric substrate 101. The thickness H1 of the dielectric substrate 101 is 200 μm. In this way, the entire frequency selective surface unit 100 has the thickness of 206 μm, which achieves the low profile of the frequency selective surface unit 100. In addition, the dielectric substrate 101 has a square structure with a side length D1 of 10 mm. The size of one dielectric substrate 101 is small, which is conducive to achieving the miniaturization of the frequency selective surface units 100 with the same passband, and widening the application range of the frequency selective surface structures 1001 on the small-sized electronic devices 1000.

The first resonant pattern 110 is the fractal pattern based on an equilateral triangle and includes the three stages of the sub-portions 111. The side length L1 of the first-stage sub-portion 1111 is 4 mm, the side lengths of the second-stage sub-portions 1112 are (L1/3) mm, and the side lengths of the third-stage sub-portion 1113 are (L1/9) mm. The second resonant pattern 120 includes three square rings 121 whose centers overlap. In the direction from inside to outside, a side length L3 of the innermost square ring 121 is 6 mm, a side length L4 of the middle square ring is 8 mm, and a side length L5 of the outermost square ring is 10 mm. The widths W1 of the square rings 121 are 0.2 mm.

Figure 26:
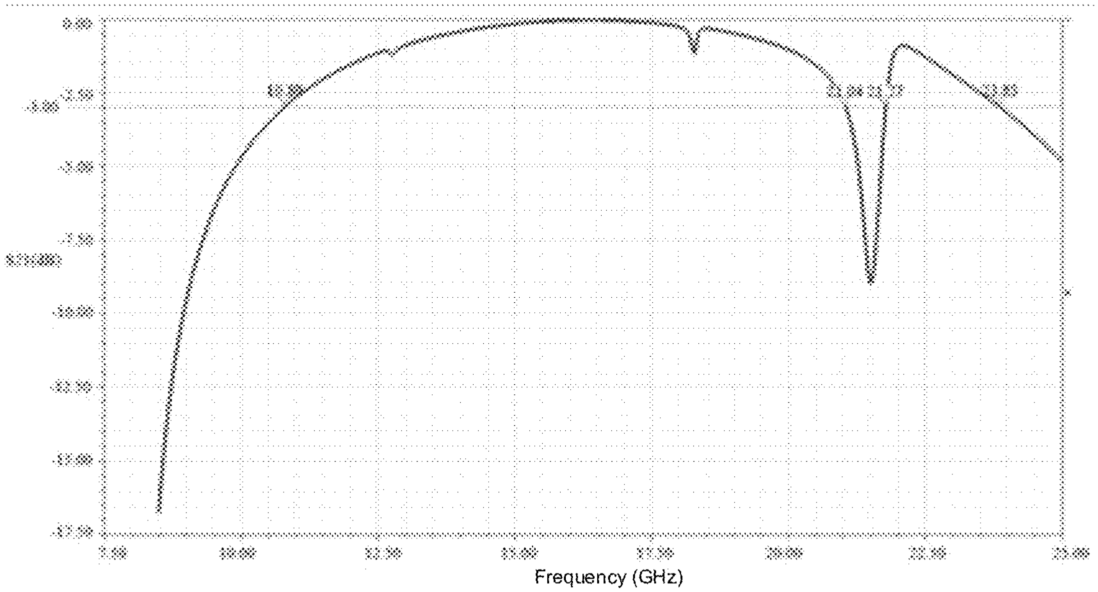
FIG. 26 is a diagram showing a simulation result of a frequency selective surface unit, in accordance with FIGS. 10 and 11.

The HFSS simulation result is as shown in FIG. 26. The frequency selective surface unit provided in this example has a passband of 10.8 GHz to 21.04 GHz, a bandwidth of 10.6 GHz, a center frequency of 15.92 GHz and a relative bandwidth of 67%, which achieves the UWB transmission (the relative bandwidth is greater than 25%). In addition, as shown in FIG. 26, the junction of the range of the frequencies of the electromagnetic waves passing through the frequency selective surface unit 100 and the cutoff frequency of −3 dB reflects the steepness of the passband and the stopband. That is, the slope is large, and the edge of the passband has the edge steep drop characteristic, which realizes the good out-of-band suppression performance of the frequency selective surface unit 100 and reduces the impact of clutter on the communication quality.

In yet another specific example, as shown in FIGS. 16 and 17, the frequency selective surface unit 100 includes one dielectric substrate 101, one first resonant pattern 110 and one second resonant pattern 120. The first resonant pattern 110 and the second resonant pattern 120 are disposed on the two opposite surfaces of the dielectric substrate 101, respectively, and the orthographic projection of the first resonant pattern 110 on the dielectric substrate 101 overlaps with at least part of orthographic projections of the first extending portions 1221 of the second resonant pattern 120 on the dielectric substrate 101. The thickness H1 of the dielectric substrate 101 is 200 μm. In this way, the entire frequency selective surface unit 100 has the thickness of 206 μm, which achieves the low profile of the frequency selective surface unit 100. In addition, the dielectric substrate 101 has a square structure with a side length D1 of 10 mm. The size of the dielectric substrate 101 is small, which is conducive to achieving the miniaturization of the frequency selective surface unit 100 with the same passband, and widening the application range of the frequency selective surface structures 1001 on the small-sized electronic devices 1000.

The first resonant pattern 110 is the fractal pattern based on an equiangular triangle and includes the three stages of sub-portions 111. The side length L1 of the first-stage sub-portion 1111 is 4 mm, the side lengths of the second-stage sub-portions 1112 are (L1/3) mm, and the side lengths of the third-stage sub-portions 1113 are (L1/9) mm. The second resonant pattern 120 is the serpentine structure 122, and the serpentine structure 122 includes the plurality of first extending portions 1221 and the plurality of second extending portions 1222. Lengths L6 of the first extending portions 1221 are 5 mm, and widths W2 of the first extending portions 1221 are 0.2 mm, and the distance H2 between two adjacent first extending portions is 0.2 mm.

Figure 27:
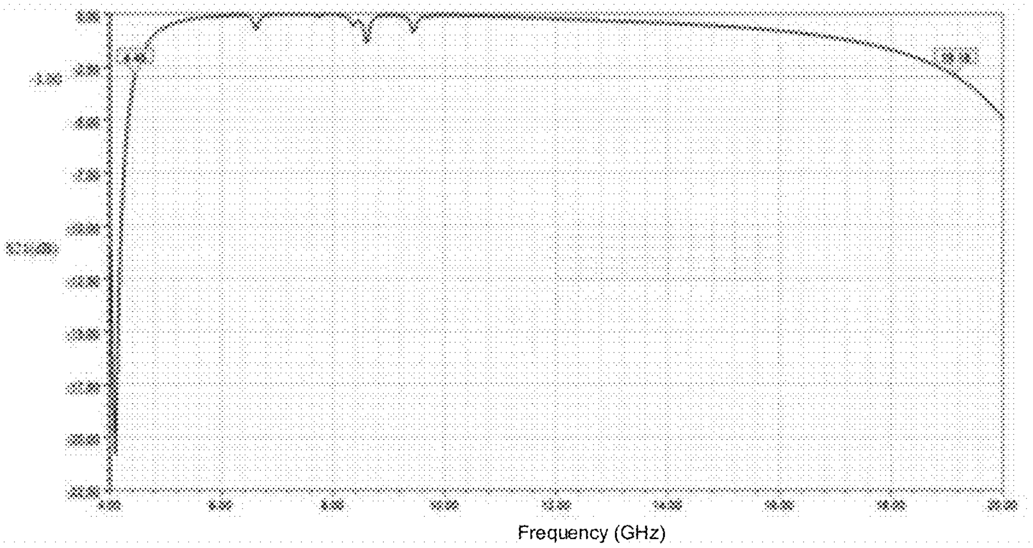
FIG. 27 is a diagram showing a simulation result of a frequency selective surface unit, in accordance with FIGS. 16 and 17.

The HFSS simulation result is as shown in FIG. 27. The frequency selective surface unit 100 provided in this example has a passband of 4.45 GHz to 19.18 GHz, a center frequency of 11.82 GHz, a bandwidth of 14.73 GHz and a relative bandwidth of 125%, which achieves the UWB transmission (the relative bandwidth is greater than 25%). In addition, the edge of the passband has the steep drop characteristic, that is, the slope is large, so that the good out-of-band suppression performance is good and the impact of clutter on the communication quality is reduced.

In yet another specific example, as shown in FIG. 20, the frequency selective surface unit 100 includes four dielectric substrates 101 that are arranged in a stack, three first resonant patterns 110 and two second resonant patterns 120. In a thickness direction of the dielectric substrates 101 (i.e., the direction perpendicular to the dielectric substrate 101), a first resonant pattern 110 is disposed on an outermost surface of an outermost dielectric substrate 101, and the first resonant patterns 110 and the second resonant patterns 120 are alternately arranged. The thickness H1 of the dielectric substrate 101 is 50 μm, and a thickness H3 of the four dielectric substrates 101 that are arranged in a stack is 200 μm. In this way, the entire frequency selective surface unit 100 has a thickness of 215 μm, which achieves the low profile of the frequency selective surface unit 100. In addition, the dielectric substrate 101 has a square structure with a side length D1 of 5 mm. The size of the dielectric substrate 101 is small, which is conducive to achieving the miniaturization of the frequency selective surface unit 100 with the same passband frequency range, and widening the application range of the frequency selective surface structures 1001 on the small-sized electronic devices 1000.

As shown in FIG. 9, the first resonant pattern 110 is the fractal pattern based on an equilateral triangle and includes the three stages of sub-portions 111. The side length L1 of the first-stage sub-portion 1111 is 4 mm, the side lengths of the second-stage sub-portions 1112 are (L1/3) mm, and the side lengths of the third-stage sub-portions 1113 are (L1/9) mm. As shown in FIG. 5B, the second resonant pattern includes the three square rings whose centers overlap. In the direction from outside to inside, the side length L5 of the outermost square ring is 3.1 mm, the side length L4 of the middle square ring is 0.8 by L5 mm, and the side length L3 of the innermost square ring is 0.4 by L5 mm. The widths W1 of the square rings are 0.2 mm.

Figure 28:
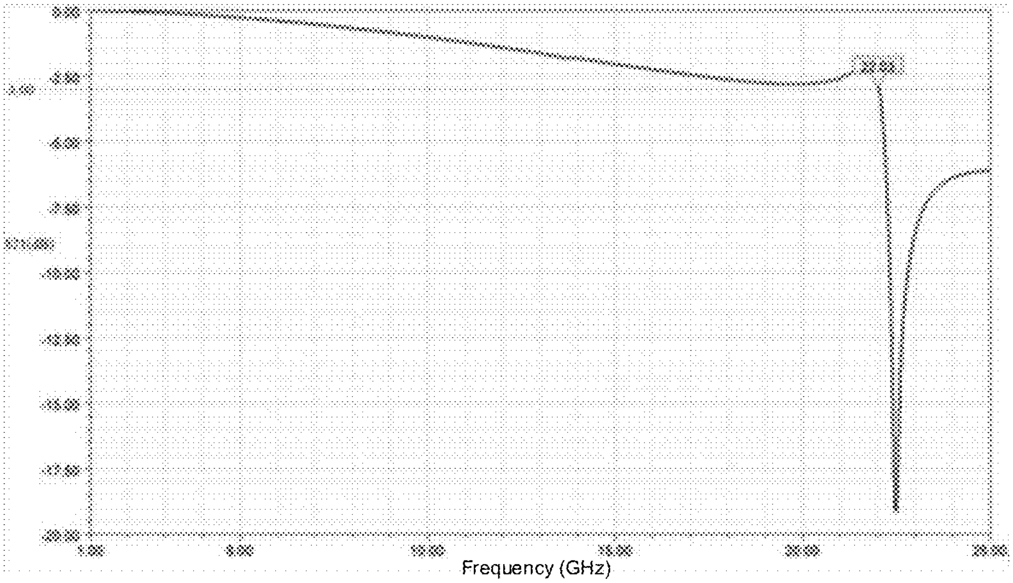
FIG. 28 is a diagram showing a simulation result of a frequency selective surface unit, in accordance with FIG. 20.

The HFSS simulation result is as shown in FIG. 28. The frequency selective surface unit 100 provided in this example has a passband of 0 GHz to 22.03 GHz, a center frequency of 11 GHz, a bandwidth of 22.03 GHz and a relative bandwidth of 200%, which achieves the UWB transmission (the relative bandwidth is greater than 25%). In addition, as shown in FIG. 28, the junction between the range of the frequencies of the electromagnetic wave passing through the frequency selective surface unit 100 and the cutoff frequency of −3 dB reflects the steepness of the passband and the stopband. That is, the slope is large, and the edge of the passband has the edge steep drop characteristic, which realizes the good out-of-band suppression performance of the frequency selective surface unit 100 and reduces the impact of clutter on the communication quality.

In yet another specific example, as shown in FIG. 21, the frequency selective surface unit 100 includes four dielectric substrates 101 that are arranged in a stack, three first resonant patterns 110 and two second resonant patterns 120. In the thickness direction of the dielectric substrates 101, a first resonant pattern 110 is disposed on an outermost surface of the outermost dielectric substrate 101, and the first resonant patterns 110 and the second resonant patterns 120 are alternately arranged. The thickness H1 of the dielectric substrate 101 is 50 μm, and the thickness H3 of the four dielectric substrates 101 that are arranged in a stack is 200 μm. In this way, the entire frequency selective surface unit 100 has a thickness of 215 μm, which achieves the low profile of the frequency selective surface unit 100. In addition, the dielectric substrate 101 has a square structure with a side length D1 of 5 mm. The size of the dielectric substrate 101 is small, which is conducive to achieving the miniaturization of the frequency selective surface unit 100 with the same passband frequency range, and widening the application range of the frequency selective surface structures 1001 on the small-sized electronic devices 1000.

As shown in FIG. 3, the first resonant pattern 110 is the fractal pattern based on a square and includes the sub-portions 111 in the two stages. Corners of the first-stage sub-portion 1111 are connected to corners of the second-stage sub-portions 1112. The first-stage sub-portion 1111 and the second-stage sub-portions 1112 have the same shape and size. The side length L7 of the first-stage sub-portion 1111 is 1 mm, and the side length L8 of the second-stage sub-portion 1112 is 1 mm. Portions of the second-stage sub-portions 1112 that overlap with the first-stage sub-portion 1111 are in a shape of a square. That is, a side length L9 of a remaining portion of a side of the second-stage sub-portion 1112 is 0.75 mm, and the remaining portion of the side is a portion except a portion of the side overlapping with the first-stage sub-portion 1111. As shown in FIG. 5B, the second resonant pattern includes the three square rings whose centers overlap, and in the direction from outside to inside, the side length L5 of the outermost square ring is 3.1 mm, the side length L4 of the middle square ring is 0.8 by L5 mm, and the side length L3 of the innermost square ring is 0.4 by L5 mm. The widths W1 of the square rings are 0.2 mm.

Figure 29:
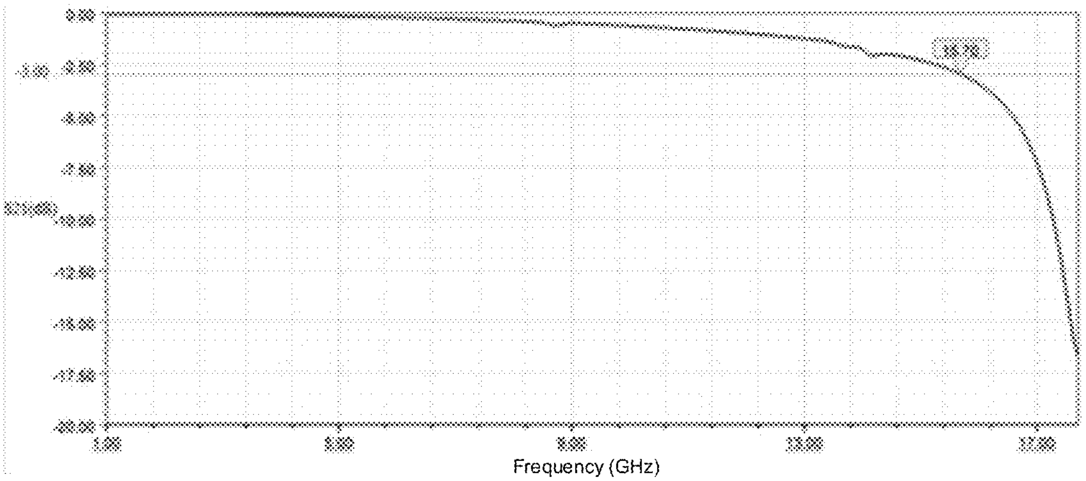
FIG. 29 is a diagram showing a simulation result of a frequency selective surface unit, in accordance with FIG. 21.

The HFSS simulation result is as shown in FIG. 29. The frequency selective surface unit 100 provided in this example has a passband of 0 GHz to 15.7 GHz, a center frequency of 7.85 GHz, a bandwidth of 15.7 GHz and a relative bandwidth of 200%, which achieves the UWB transmission. In addition, as shown in FIG. 29, the junction of the range of the frequencies of the electromagnetic waves passing through the frequency selective surface unit 100 and the cutoff frequency of −3 dB reflects the steepness of the passband and the stopband. That is, the slope is large, and the edge of the passband has the edge steep drop characteristic, which realizes the good out-of-band suppression performance of the frequency selective surface unit 100 and reduces the impact of clutter on the communication quality.

In yet another specific example, as shown in FIG. 22, the frequency selective surface unit 100 includes four dielectric substrates 101 that are arranged in a stack, three first resonant patterns 110 and two second resonant patterns 120. In the thickness direction of the dielectric substrates 101, a first resonant pattern 110 is disposed on an outermost surface of the outermost dielectric substrate 101, and the first resonant patterns 110 and the second resonant patterns 120 are alternately arranged on the dielectric substrates 101. The thickness H1 of the dielectric substrate 101 is 50 μm, and the thickness H3 of the four dielectric substrates 101 that are arranged in a stack is 200 μm. In this way, the entire frequency selective surface unit 100 has a thickness of 215 μm, which achieves the low profile of the frequency selective surface unit 100. In addition, the dielectric substrate 101 has a square structure with a side length D1 of 10 mm. The size of the dielectric substrate 101 is small, which is conducive to achieving the miniaturization of the frequency selective surface unit 100 with the same passband frequency range, and widening the application range of the frequency selective surface structures 1001 on the small-sized electronic devices 1000.

As shown in FIG. 9, the first resonant pattern 110 is the fractal pattern based on an equiangular triangle and includes the three stages of sub-portions 111. The side length L1 of the first-stage sub-portion 1111 is 4 mm, the side lengths of the second-stage sub-portions 1112 are (L1/3) mm, and the side lengths of the third-stage sub-portions 1113 are (L1/9) mm. As shown in FIG. 6, the second resonant pattern 120 is the serpentine structure 122, and the serpentine structure 122 includes the plurality of first extending portions 1221 and the plurality of second extending portions 1222. The lengths L6 of the first extending portions 1221 are 8 mm, and the widths W2 of the first extending portions 1221 are 0.2 mm; and the distance H2 between two adjacent first extending portions is 0.2 mm.

Figure 30:
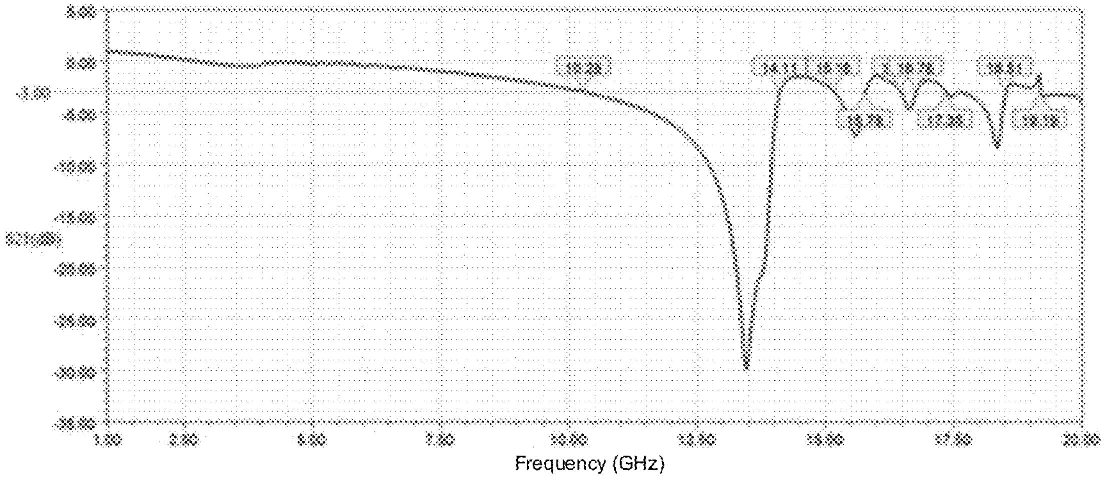
FIG. 30 is a diagram showing a simulation result of a frequency selective surface unit, in accordance with FIG. 22.

The HFSS simulation result is as shown in FIG. 30. The frequency selective surface unit 100 provided in this example has a passband of 0 GHz to 10.28 GHz, a center frequency of 5.14 GHz, a bandwidth of 10.28 GHz and a relative bandwidth of 200%, which achieves the UWB transmission. In addition, as shown in FIG. 30, the junction of the range of the frequencies of the electromagnetic waves passing through the frequency selective surface unit 100 and the cutoff frequency of −3 dB reflects the steepness of the passband and the stopband. That is, the slope is large, the edge of the passband has the edge steep drop characteristic, which realizes the good out-of-band suppression performance of the frequency selective surface unit 100 and reduces the impact of clutter on the communication quality.

The foregoing descriptions are merely specific implementation manners of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A frequency selective surface unit, comprising:

at least one dielectric substrate;

at least one first resonant pattern, wherein a first resonant pattern is disposed on a dielectric substrate, and each of the at least one first resonant pattern includes a plurality of protruding portions; and at least one second resonant pattern, wherein a second resonant pattern is disposed on the dielectric substrate, and the second resonant pattern and the first resonant pattern have a distance therebetween in at least one of a direction parallel to a plane where the dielectric substrate is located and a direction perpendicular to the dielectric substrate;

wherein the second resonant pattern is a serpentine structure, and the serpentine structure includes a plurality of first extending portions and a plurality of second extending portions; the plurality of first extending portions are parallel to each other, an extension direction of the plurality of first extending portions intersects an extension direction of the plurality of second extending portions, and two adjacent first extending portions are connected to each other through a second extending portion;

the second resonant pattern and the first resonant pattern are disposed on two opposite surfaces of the dielectric substrate in the direction perpendicular to the dielectric substrate, respectively; and an orthographic projection of the first resonant pattern on the dielectric substrate partially overlaps with an orthographic projection of at least one first extending portion on the dielectric substrate; and a width of each first extending portion and a distance between two adjacent first extending portions are equal.

2. The frequency selective surface unit according to claim 1, wherein the first resonant pattern is a fractal pattern; and the plurality of protruding portions are classified into a plurality of stages of sub-portions, and sub-portions in a next stage are protruding portions located on edges of a sub-portion in a current stage; except for a first stage of sub-portions, each stage of sub-portions includes at least two sub-portions separated from each other, and the at least two sub-portions included in each stage of sub-portions have a same structure.

3. The frequency selective surface unit according to claim 2, wherein each sub-portion has a triangular structure or a rectangular structure.

4. The frequency selective surface unit according to claim 1, wherein the frequency selective surface unit comprises a plurality of dielectric substrates that are arranged in a stack, a plurality of first resonant patterns and a plurality of second resonant patterns; and the plurality of first resonant patterns and the plurality of second resonant patterns are alternately arranged in the direction perpendicular to the dielectric substrate, and at least one dielectric substrate is arranged between a first resonant pattern and a second resonant pattern that are adjacent.

5. The frequency selective surface unit according to claim 4, wherein the plurality of first resonant patterns have a same structure, and/or the plurality of second resonant patterns have a same structure.

6. The frequency selective surface unit according to claim 4, wherein an orthographic projection of the first resonant pattern on the dielectric substrate partially overlaps with an orthographic projection of the second resonant pattern on the dielectric substrate, and overlapping portions of the orthographic projections of the first resonant pattern and the second resonant pattern on the dielectric substrate include a plurality of overlapping regions separated from each other.

7. The frequency selective surface unit according to claim 4, wherein a first resonant pattern is located on an outermost surface of an outermost dielectric substrate of the frequency selective surface unit in the direction perpendicular to the dielectric substrate.

8. The frequency selective surface unit according to claim 1, wherein a thickness of the at least one dielectric substrate is in a range from 50 μm to 500 μm.

9. The frequency selective surface unit according to claim 1, wherein a material of the at least one dielectric substrate includes a flexible insulating material.

10. A frequency selective surface structure, comprising a plurality of frequency selective surface units according to claim 1 arranged in an array.

11. An electronic device, comprising the frequency selective surface structure according to claim 10.

12. A radome, comprising the frequency selective surface structure according to claim 10, and a radome body.

* * * * *